US012561728B2

(12) United States Patent
Chabaneix et al.

(10) Patent No.: US 12,561,728 B2
(45) Date of Patent: Feb. 24, 2026

(54) DATA AGGREGATION AND COMPRESSION SYSTEMS FACILITATING DATA BASE QUERYING AND FILE MANAGEMENT

(71) Applicant: Truist Bank, Charlotte, NC (US)

(72) Inventors: Silvia Chabaneix, Charlotte, NC (US); Caelyn Barrett, Charlotte, NC (US); Joanna Zheng, Atlanta, GA (US); John Henson, Sharpsburg, GA (US); Samuel Parrish, Atlanta, GA (US); Adeyemi Toluwani Adeyemo, Stone Mountain, GA (US)

(73) Assignee: TRUIST BANK, Charlotte, NC (US)

( * ) Notice: Subject to any disclaimer, the term of this patent is extended or adjusted under 35 U.S.C. 154(b) by 59 days.

(21) Appl. No.: 18/778,062

(22) Filed: Jul. 19, 2024

(65) Prior Publication Data

US 2026/0024123 A1 Jan. 22, 2026

(51) Int. Cl.
G06Q 30/0601 (2023.01)
G06F 16/25 (2019.01)
G06F 16/28 (2019.01)

(52) U.S. Cl.
CPC ....... G06Q 30/0631 (2013.01); G06F 16/258 (2019.01); G06F 16/285 (2019.01)

(58) Field of Classification Search
CPC ........ G06Q 30/0601–0645; G06Q 40/00–068; G06F 15/258; G06F 15/285; G06F 16/245; G06F 16/33; G06F 16/2455–24569; G06F 16/35–38
USPC ........... 705/26.1–27.2, 35–45; 707/705–788
See application file for complete search history.

(56) References Cited

U.S. PATENT DOCUMENTS

| | | | | |
|---|---|---|---|---|
| 12,235,811 B2 * | 2/2025 | Shatsky | ................ | G06F 16/215 |
| 2021/0226953 A1 * | 7/2021 | Rose | ..................... | G06F 40/289 |
| 2023/0306040 A1 * | 9/2023 | Dhameja | ............... | G06F 16/258 |
| 2024/0394251 A1 * | 11/2024 | Brende | ............. | G06F 16/24522 |

OTHER PUBLICATIONS

A. Mohammed, K. Ramlal, P. Hosein and N. Henry, "Marketing Channel Recommendations in Banking," 2021 Second International Conference on Intelligent Data Science Technologies and Applications (IDSTA), Tartu, Estonia, 2021, pp. 60-65.*

* cited by examiner

*Primary Examiner* — Resha Desai
(74) *Attorney, Agent, or Firm* — Michael A. Springs, Esq.; Shumaker, Loop & Kendrick, LLP; Patrick B. Horne

(57) ABSTRACT

Systems and methods query third-party data base(s) to obtain object data for each third-party object that is associated with action-based outcomes obtainable via use of the third-party objects, where the data base(s) are queried during a time having relatively less operational strain on system resources. Object data is received from the third-party database(s) and formatting thereof is standardized such that the object data is transformed into a uniform datatype format for analysis. The object data is compressed, which includes encoding the object data to reduce storage size by determining whether stored action-based outcomes are duplicative with updated action-based outcomes identified by the object data. The object data is classified by metadata labeling that includes indicating third-party coding associated with the action-based outcomes and according to indexing rule(s) to facilitate generation of a prioritization list that includes derived improvement(s) available to a user during use of a third-party object.

20 Claims, 9 Drawing Sheets

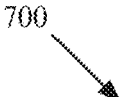

700

QUERY ONE OR MORE THIRD-PARTY DATA BASES TO OBTAIN
OBJECT DATA FOR EACH THIRD-PARTY OBJECT OF A PLURALITY
OF THIRD-PARTY OBJECTS, THE OBJECT DATA BEING
ASSOCIATED WITH ACTION-BASED OUTCOMES OBTAINABLE VIA
USE OF EACH OF THE THIRD-PARTY OBJECTS, WHEREIN THE ONE
OR MORE THIRD-PARTY DATA BASES ARE QUERIED DURING A
PREDETERMINED TIME HAVING RELATIVELY LESS OPERATIONAL
STRAIN ON SYSTEM RESOURCES ASSOCIATED WITH THE ONE OR
MORE THIRD-PARTY DATA BASES
705

RECEIVE, FROM THE ONE OR MORE THIRD-PARTY DATA BASES, THE
QUERIED OBJECT DATA
710

STANDARDIZE FORMATTING OF THE RECEIVED OBJECT DATA,
THE FORMATTING BEING STANDARDIZED SUCH THAT THE
OBJECT DATA IS TRANSFORMED INTO A UNIFORM DATATYPE
FORMAT FOR ANALYSIS
715

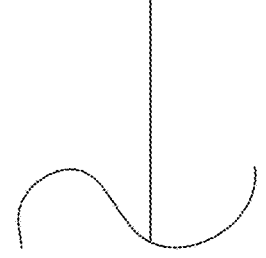

FIG. 7A

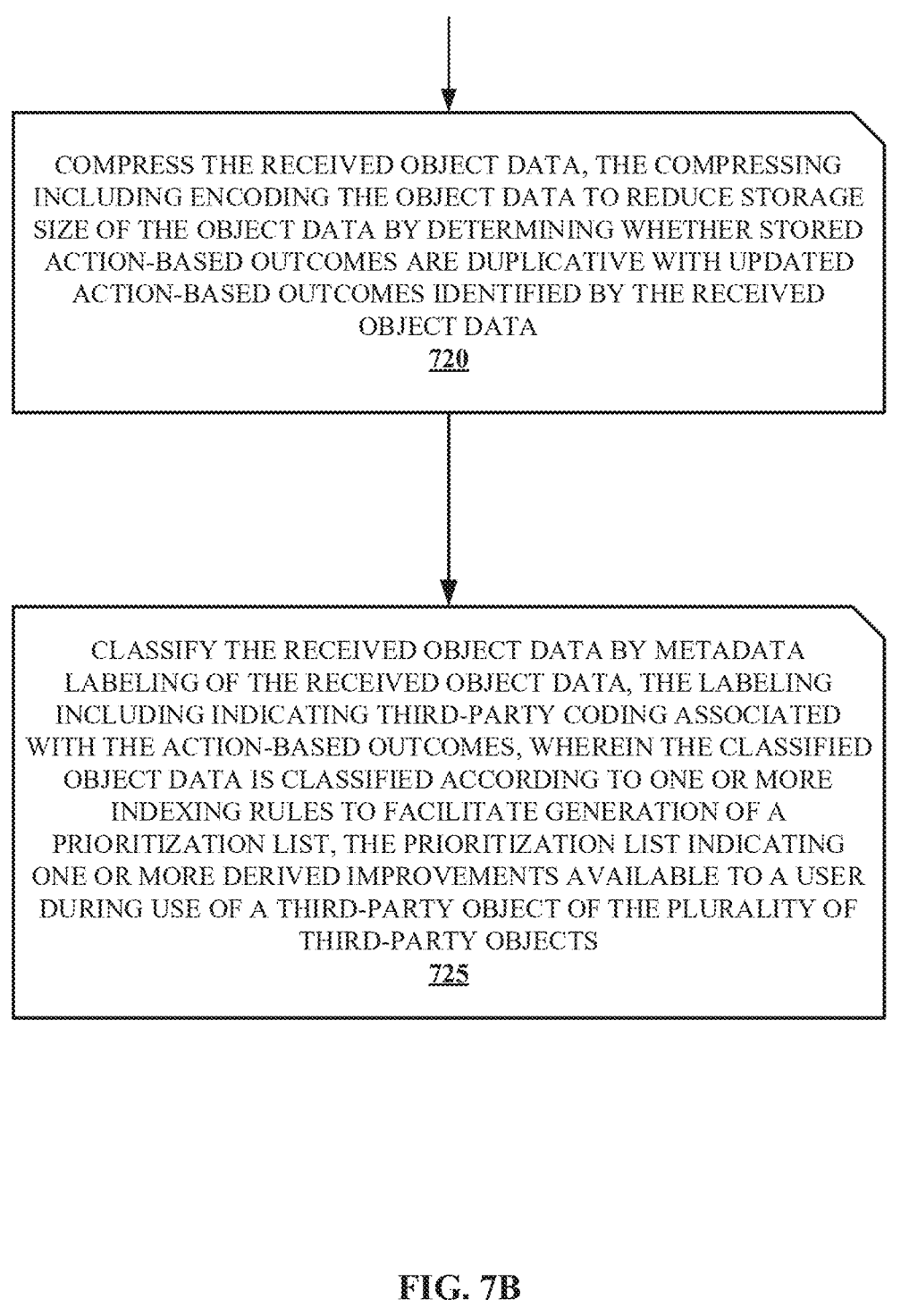

COMPRESS THE RECEIVED OBJECT DATA, THE COMPRESSING INCLUDING ENCODING THE OBJECT DATA TO REDUCE STORAGE SIZE OF THE OBJECT DATA BY DETERMINING WHETHER STORED ACTION-BASED OUTCOMES ARE DUPLICATIVE WITH UPDATED ACTION-BASED OUTCOMES IDENTIFIED BY THE RECEIVED OBJECT DATA
720

CLASSIFY THE RECEIVED OBJECT DATA BY METADATA LABELING OF THE RECEIVED OBJECT DATA, THE LABELING INCLUDING INDICATING THIRD-PARTY CODING ASSOCIATED WITH THE ACTION-BASED OUTCOMES, WHEREIN THE CLASSIFIED OBJECT DATA IS CLASSIFIED ACCORDING TO ONE OR MORE INDEXING RULES TO FACILITATE GENERATION OF A PRIORITIZATION LIST, THE PRIORITIZATION LIST INDICATING ONE OR MORE DERIVED IMPROVEMENTS AVAILABLE TO A USER DURING USE OF A THIRD-PARTY OBJECT OF THE PLURALITY OF THIRD-PARTY OBJECTS
725

FIG. 7B

800

RECEIVE, FROM ONE OR MORE THIRD-PARTY DATABASES, OBJECT DATA ASSOCIATED WITH ACTION-BASED OUTCOMES OBTAINABLE VIA USE OF A RESPECTIVE THIRD-PARTY OBJECT OF A PLURALITY OF THIRD-PARTY OBJECTS
805

COMPRESS THE RECEIVED OBJECT DATA, THE COMPRESSING INCLUDING ENCODING THE OBJECT DATA TO REDUCE STORAGE SIZE OF THE OBJECT DATA BY DETERMINING WHETHER STORED ACTION-BASED OUTCOMES ARE DUPLICATIVE WITH UPDATED ACTION-BASED OUTCOMES IDENTIFIED BY THE RECEIVED OBJECT DATA
810

CLASSIFY THE RECEIVED OBJECT DATA BY METADATA LABELING OF THE RECEIVED OBJECT DATA, THE LABELING INCLUDING INDICATING THIRD-PARTY CODING ASSOCIATED WITH THE ACTION-BASED OUTCOMES, WHEREIN THE CLASSIFIED OBJECT DATA IS CLASSIFIED ACCORDING TO ONE OR MORE INDEXING RULES TO FACILITATE GENERATION OF A PRIORITIZATION LIST, THE PRIORITIZATION LIST INDICATING ONE OR MORE DERIVED IMPROVEMENTS AVAILABLE TO A USER DURING USE OF A THIRD-PARTY OBJECT OF THE PLURALITY OF THIRD-PARTY OBJECTS
815

FIG. 8

DATA AGGREGATION AND COMPRESSION SYSTEMS FACILITATING DATA BASE QUERYING AND FILE MANAGEMENT

FIELD OF THE INVENTION

This invention relates generally to the field of databases, and more particularly embodiments of the invention relate to data aggregation and compression systems.

BACKGROUND OF THE INVENTION

Data aggregation involves gathering and compiling data from multiple sources to create a comprehensive dataset. Data aggregation allows organizations to combine disparate pieces of information to provide a more holistic view of the data, which can then be used by organizations to analyze trends, identify patterns and uncover correlations that might not be readily apparent from isolated datasets. However, a need exists for improved data aggregation systems so that the data can be better utilized and leveraged for various use cases.

BRIEF SUMMARY

Shortcomings of the prior art are overcome and additional advantages are provided through the provision of a computing system for data aggregation and compression facilitating data base querying and file management. The system includes, for instance, a memory, one or more processors in communication with the memory, and program instructions executable by the one or more processors via the memory. Execution of the program instructions includes, in part, querying one or more third-party data bases to obtain object data for each third-party object of a plurality of third-party objects, the object data being associated with action-based outcomes obtainable via use of each of the third-party objects, wherein the one or more third-party data bases are queried during a predetermined time having relatively less operational strain on system resources associated with the one or more third-party data bases. Further, the queried object data are received from the one or more third-party data bases and formatting of the received object data is standardized such that the object data is transformed into a uniform datatype format for analysis. The received object data are compressed, where the compressing includes encoding the object data to reduce storage size of the object data by determining whether stored action-based outcomes are duplicative with updated action-based outcomes identified by the received object data. Further, the received object data are classified by metadata labeling of the received object data, where the labeling includes indicating third-party coding associated with the action-based outcomes and where the classified object data is classified according to one or more indexing rules to facilitate generation of a prioritization list, the prioritization list indicating one or more derived improvements available to a user during use of a third-party object of the plurality of third-party objects.

Additionally, disclosed herein is a computing method for data aggregation and compression facilitating data base querying and file management. The method includes querying one or more third-party data bases to obtain object data for each third-party object of a plurality of third-party objects, the object data being associated with action-based outcomes obtainable via use of each of the third-party objects, wherein the one or more third-party data bases are queried during a predetermined time having relatively less operational strain on system resources associated with the one or more third-party data bases. The method also includes receiving, from the one or more third-party data bases, the queried object data, and standardizing formatting of the received object data, the formatting being standardized such that the object data is transformed into a uniform datatype format for analysis. In addition, the method includes compressing of the received object data, the compressing including encoding the object data to reduce storage size of the object data by determining whether stored action-based outcomes are duplicative with updated action-based outcomes identified by the received object data. The method also includes classifying the received object data by metadata labeling of the received object data, the labeling including indicating third-party coding associated with the action-based outcomes, wherein the classified object data is classified according to one or more indexing rules to facilitate generation of a prioritization list, the prioritization list indicating one or more derived improvements available to a user during use of a third-party object of the plurality of third-party objects.

Also disclosed herein is a computing system that includes at least one processor, a communication interface communicatively coupled to the at least one processor, and a memory device storing executable code that, when executed, causes the at least one processor to, at least in part, receive, from one or more third-party databases, object data associated with action-based outcomes obtainable via use of a respective third-party object of a plurality of third-party objects. Further, the received object data is compressed, where the compressing includes encoding the object data to reduce storage size of the object data by determining whether stored action-based outcomes are duplicative with updated action-based outcomes identified by the received object data. Further, the received object data is classified by metadata labeling of the received object data, the labeling including indicating third-party coding associated with the action-based outcomes, wherein the classified object data is classified according to one or more indexing rules to facilitate generation of a prioritization list, the prioritization list indicating one or more derived improvements available to a user during use of a third-party object of the plurality of third-party objects.

The features, functions, and advantages that have been described herein may be achieved independently in various embodiments of the present invention including computer-implemented methods, computer program products, and computing systems or may be combined in yet other embodiments, further details of which can be seen with reference to the following description and drawings.

BRIEF DESCRIPTION OF THE SEVERAL VIEWS OF THE DRAWINGS

One or more aspects are particularly pointed out and distinctly claimed as examples in the claims at the conclusion of the specification. The foregoing as well as objects, features, and advantages of one or more aspects are apparent from the following detailed description taken in conjunction with the accompanying drawings in which:

FIG. 7A is a flow chart representing a method, according to at least one embodiment, of receiving and formatting third-party data from third-party databases;

FIG. 7B is a flow chart representing a method, according to at least one embodiment, of receiving and formatting third-party data from third-party databases; and FIG. 8 is a block diagram of an example method, according to an embodiment of the invention.

DETAILED DESCRIPTION

Figure 1:
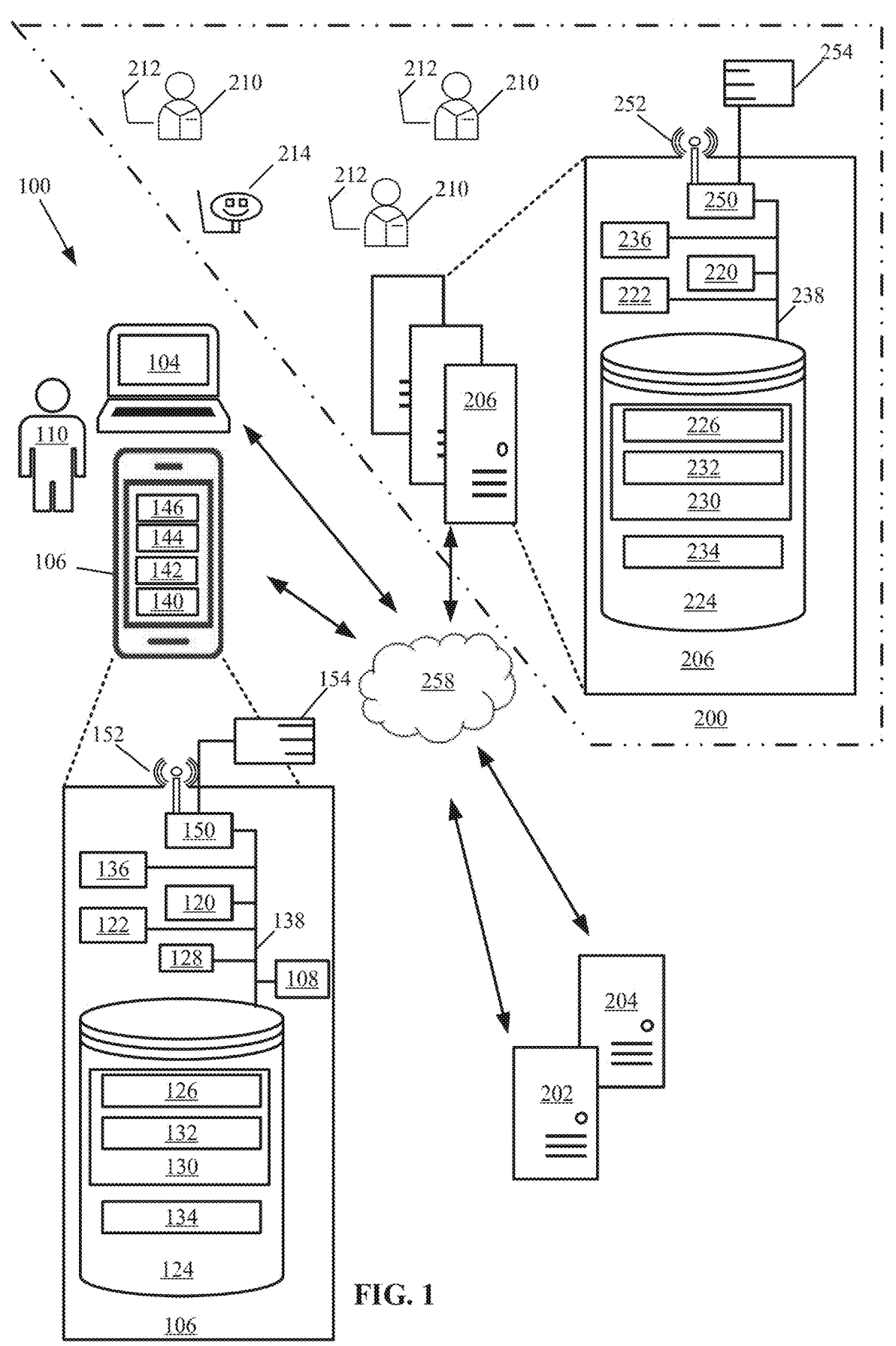
FIG. 1 illustrates an enterprise system, and environment thereof for data aggregation and compression facilitating data base querying and file management, in accordance with an embodiment of the present invention.

Aspects of the present invention and certain features, advantages, and details thereof are explained more fully below with reference to the non-limiting examples illustrated in the accompanying drawings. Descriptions of well-known processing techniques, systems, components, etc. are omitted so as to not unnecessarily obscure the invention in detail. It should be understood that the detailed description and the specific examples, while indicating aspects of the invention, are given by way of illustration only, and not by way of limitation. Various substitutions, modifications, additions, and/or arrangements, within the spirit and/or scope of the underlying inventive concepts will be apparent to those skilled in the art from this disclosure. Note further that numerous inventive aspects and features are disclosed herein, and unless inconsistent, each disclosed aspect or feature is combinable with any other disclosed aspect or feature as desired for a particular embodiment of the concepts disclosed herein.

Unless described or implied as exclusive alternatives, features throughout the drawings and descriptions should be taken as cumulative, such that features expressly associated with some particular embodiments can be combined with other embodiments.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the herein described embodiments can be configured without departing from the scope and spirit of the invention. Therefore, it is to be understood that, within the scope of the included claims, the invention may be practiced other than as specifically described herein.

Additionally, illustrative embodiments are described below using specific code, designs, architectures, protocols, layouts, schematics, or tools only as examples, and not by way of limitation. Furthermore, the illustrative embodiments are described in certain instances using particular software, tools, or data processing environments only as example for clarity of description. The illustrative embodiments can be used in conjunction with other comparable or similarly purposed structures, systems, applications, or architectures. One or more aspects of an illustrative embodiment can be implemented in hardware, software, or a combination thereof.

As understood by one skilled in the art, program code, as referred to in this application, can include both software and hardware. For example, program code in certain embodiments of the present invention can include fixed function hardware, while other embodiments can utilize a software-based implementation of the functionality described. Certain embodiments combine both types of program code.

FIG. 1 illustrates a system 100 and environment thereof, according to at least one embodiment, by which a user 110 benefits through use of services and products of an enterprise system 200. The environment may include, for example, a distributed cloud computing environment (private cloud, public cloud, community cloud, and/or hybrid cloud), an on-premise environment, fog computing environment, and/or an edge computing environment. The user 110 accesses services and products by use of one or more user devices, illustrated in separate examples as a computing device 104 and a mobile device 106, which may be, as non-limiting examples, a smart phone, a portable digital assistant (PDA), a pager, a mobile television, a gaming device, a laptop computer, a camera, a video recorder, an audio/video player, radio, a GPS device, or any combination of the aforementioned, or other portable device with processing and communication capabilities. In the illustrated example, the mobile device 106 is illustrated in FIG. 1 as having exemplary elements, the below descriptions of which apply as well to the computing device 104, which can be, as non-limiting examples, a desktop computer, a laptop computer, or other user-accessible computing device.

Furthermore, the user device, referring to either or both of the computing device 104 and the mobile device 106, may be or include a workstation, a server, or any other suitable device, including a set of servers, a cloud-based application or system, or any other suitable system, adapted to execute, for example any suitable operating system, including Linux, UNIX, Windows, macOS, IOS, Android and any other known operating system used on personal computers, central computing systems, phones, and other devices.

The user 110 can be an individual, a group, or any entity in possession of or having access to the user device, referring to either or both of the mobile device 104 and computing device 106, which may be personal or public items. Although the user 110 may be singly represented in some drawings, at least in some embodiments according to these descriptions the user 110 is one of many such that a market or community of users, consumers, customers, business entities, government entities, clubs, and groups of any size are all within the scope of these descriptions.

The user device, as illustrated with reference to the mobile device 106, includes components such as, at least one of each of a processing device 120, and a memory device 122 for processing use, such as random access memory (RAM), and read-only memory (ROM). The illustrated mobile device 106 further includes a storage device 124 including at least one of a non-transitory storage medium, such as a microdrive, for long-term, intermediate-term, and short-term storage of computer-readable instructions 126 for execution by the processing device 120. For example, the instructions 126 can include instructions for an operating system and various applications or programs 130, of which the application 132 is represented as a particular example. The storage device 124 can store various other data items 134, which can include, as non-limiting examples, cached data, user files such as those for pictures, audio and/or video recordings, files downloaded or received from other devices, and other data items preferred by the user or required or related to any or all of the applications or programs 130.

The memory device 122 is operatively coupled to the processing device 120. As used herein, memory includes any computer readable medium to store data, code, or other information. The memory device 122 may include volatile memory, such as volatile Random Access Memory (RAM) including a cache area for the temporary storage of data. The memory device 122 may also include non-volatile memory, which can be embedded and/or may be removable. The non-volatile memory can additionally or alternatively include an electrically erasable programmable read-only memory (EEPROM), flash memory or the like.

According to various embodiments, the memory device 122 and storage device 124 may be combined into a single storage medium. The memory device 122 and storage device 124 can store any of a number of applications which comprise computer-executable instructions and code executed by the processing device 120 to implement the functions of the mobile device 106 described herein. For example, the memory device 122 may include such applications as a conventional web browser application and/or a mobile P2P payment system client application. These applications also typically provide a graphical user interface (GUI) on the display 140 that allows the user 110 to communicate with the mobile device 106, and, for example a mobile banking system, and/or other devices or systems. In one embodiment, when the user 110 decides to enroll in a mobile banking program, the user 110 downloads or otherwise obtains the mobile banking system client application from a mobile banking system, for example enterprise system 200, or from a distinct application server. In other embodiments, the user 110 interacts with a mobile banking system via a web browser application in addition to, or instead of, the mobile P2P payment system client application.

The processing device 120, and other processors described herein, generally include circuitry for implementing communication and/or logic functions of the mobile device 106. For example, the processing device 120 may include a digital signal processor, a microprocessor, and various analog to digital converters, digital to analog converters, and/or other support circuits. Control and signal processing functions of the mobile device 106 are allocated between these devices according to their respective capabilities. The processing device 120 thus may also include the functionality to encode and interleave messages and data prior to modulation and transmission. The processing device 120 can additionally include an internal data modem. Further, the processing device 120 may include functionality to operate one or more software programs, which may be stored in the memory device 122, or in the storage device 124. For example, the processing device 120 may be capable of operating a connectivity program, such as a web browser application. The web browser application may then allow the mobile device 106 to transmit and receive web content, such as, for example, location-based content and/or other web page content, according to a Wireless Application Protocol (WAP), Hypertext Transfer Protocol (HTTP), and/or the like.

The memory device 122 and storage device 124 can each also store any of a number of pieces of information, and data, used by the user device and the applications and devices that facilitate functions of the user device, or are in communication with the user device, to implement the functions described herein and others not expressly described. For example, the storage device may include such data as user authentication information, etc.

The processing device 120, in various examples, can operatively perform calculations, can process instructions for execution, and can manipulate information. The processing device 120 can execute machine-executable instructions stored in the storage device 124 and/or memory device 122 to thereby perform methods and functions as described or implied herein, for example by one or more corresponding flow charts expressly provided or implied as would be understood by one of ordinary skill in the art to which the subject matters of these descriptions pertain. The processing device 120 can be or can include, as non-limiting examples, a central processing unit (CPU), a microprocessor, a graphics processing unit (GPU), a microcontroller, an application-specific integrated circuit (ASIC), a programmable logic device (PLD), a digital signal processor (DSP), a field programmable gate array (FPGA), a state machine, a controller, gated or transistor logic, discrete physical hardware components, and combinations thereof. In some embodiments, particular portions or steps of methods and functions described herein are performed in whole or in part by way of the processing device 120, while in other embodiments methods and functions described herein include cloud-based computing in whole or in part such that the processing device 120 facilitates local operations including, as non-limiting examples, communication, data transfer, and user inputs and outputs such as receiving commands from and providing displays to the user.

The mobile device 106, as illustrated, includes an input and output system 136, referring to, including, or operatively coupled with, one or more user input devices and/or one or more user output devices, which are operatively coupled to the processing device 120. The input and output system 136 may include input/output circuitry that may operatively convert analog signals and other signals into digital data, or may convert digital data to another type of signal. For example, the input/output circuitry may receive and convert physical contact inputs, physical movements, or auditory signals (e.g., which may be used to authenticate a user) to digital data. Once converted, the digital data may be provided to the processing device 120. The input and output system 136 may also include a display 140 (e.g., a liquid crystal display (LCD), light emitting diode (LED) display, or the like), which can be, as a non-limiting example, a presence-sensitive input screen (e.g., touch screen or the like) of the mobile device 106, which serves both as an output device, by providing graphical and text indicia and presentations for viewing by one or more user 110, and as an input device, by providing virtual buttons, selectable options, a virtual keyboard, and other indicia that, when touched, control the mobile device 106 by user action. The user output devices include a speaker 144 or other audio device. The user input devices, which allow the mobile device 106 to receive data and actions such as button manipulations and touches from a user such as the user 110, may include any of a number of devices allowing the mobile device 106 to receive data from a user, such as a keypad, keyboard, touch-screen, touchpad, microphone 142, mouse, joystick, other pointer device, button, soft key, infrared sensor, and/or other input device(s). The input and output system 136 may also include a camera 146, such as a digital camera.

Further non-limiting examples of input devices and/or output devices include, one or more of each, any, and all of a wireless or wired keyboard, a mouse, a touchpad, a button, a switch, a light, an LED, a buzzer, a bell, a printer and/or other user input devices and output devices for use by or communication with the user 110 in accessing, using, and controlling, in whole or in part, the user device, referring to either or both of the computing device 104 and a mobile device 106. Inputs by one or more user 110 can thus be made via voice, text or graphical indicia selections. For example, such inputs in some examples correspond to user-side actions and communications seeking services and products of the enterprise system 200, and at least some outputs in such examples correspond to data representing enterprise-side actions and communications in two-way communications between a user 110 and an enterprise system 200.

The input and output system 136 may also be configured to obtain and process various forms of authentication via an authentication system to obtain authentication information of a user 110. Various authentication systems may include, according to various embodiments, a recognition system that detects biometric features or attributes of a user such as, for example fingerprint recognition systems and the like (hand print recognition systems, palm print recognition systems, etc.), iris recognition and the like used to authenticate a user based on features of the user's eyes, facial recognition systems based on facial features of the user, DNA-based authentication, or any other suitable biometric attribute or information associated with a user. Additionally or alternatively, voice biometric systems may be used to authenticate a user using speech recognition associated with a word, phrase, tone, or other voice-related features of the user. Alternate authentication systems may include one or more systems to identify a user based on a visual or temporal pattern of inputs provided by the user. For instance, the user device may display, for example, selectable options, shapes, inputs, buttons, numeric representations, etc. that must be selected in a pre-determined specified order or according to a specific pattern. Other authentication processes are also contemplated herein including, for example, email authentication, password protected authentication, device verification of saved devices, code-generated authentication, text message authentication, phone call authentication, etc. The user device may enable users to input any number or combination of authentication systems.

The user device, referring to either or both of the computing device 104 and the mobile device 106 may also include a positioning device 108, which can be for example a global positioning system device (GPS) configured to be used by a positioning system to determine a location of the computing device 104 or mobile device 106. For example, the positioning system device 108 may include a GPS transceiver. In some embodiments, the positioning system device 108 includes an antenna, transmitter, and receiver. For example, in one embodiment, triangulation of cellular signals may be used to identify the approximate location of the mobile device 106. In other embodiments, the positioning device 108 includes a proximity sensor or transmitter, such as an RFID tag, that can sense or be sensed by devices known to be located proximate a merchant or other location to determine that the consumer mobile device 106 is located proximate these known devices.

In the illustrated example, a system intraconnect 138, connects, for example electrically, the various described, illustrated, and implied components of the mobile device 106. The intraconnect 138, in various non-limiting examples, can include or represent, a system bus, a high-speed interface connecting the processing device 120 to the memory device 122, individual electrical connections among the components, and electrical conductive traces on a motherboard common to some or all of the above-described components of the user device (referring to either or both of the computing device 104 and the mobile device 106). As discussed herein, the system intraconnect 138 may operatively couple various components with one another, or in other words, electrically connects those components, either directly or indirectly—by way of intermediate component(s)—with one another.

The user device, referring to either or both of the computing device 104 and the mobile device 106, with particular reference to the mobile device 106 for illustration purposes, includes a communication interface 150, by which the mobile device 106 communicates and conducts transactions with other devices and systems. The communication interface 150 may include digital signal processing circuitry and may provide two-way communications and data exchanges, for example wirelessly via wireless communication device 152, and for an additional or alternative example, via wired or docked communication by mechanical electrically conductive connector 154. Communications may be conducted via various modes or protocols, of which GSM voice calls, SMS, EMS, MMS messaging, TDMA, CDMA, PDC, WCDMA, CDMA2000, and GPRS, are all non-limiting and non-exclusive examples. Thus, communications can be conducted, for example, via the wireless communication device 152, which can be or include a radio-frequency transceiver, a Bluetooth device, Wi-Fi device, a Near-field communication device, and other transceivers. In addition, GPS (Global Positioning System) may be included for navigation and location-related data exchanges, ingoing and/or outgoing. Communications may also or alternatively be conducted via the connector 154 for wired connections such by USB, Ethernet, and other physically connected modes of data transfer.

The processing device 120 is configured to use the communication interface 150 as, for example, a network interface to communicate with one or more other devices on a network. In this regard, the communication interface 150 utilizes the wireless communication device 152 as an antenna operatively coupled to a transmitter and a receiver (together a "transceiver") included with the communication interface 150. The processing device 120 is configured to provide signals to and receive signals from the transmitter and receiver, respectively. The signals may include signaling information in accordance with the air interface standard of the applicable cellular system of a wireless telephone network. In this regard, the mobile device 106 may be configured to operate with one or more air interface standards, communication protocols, modulation types, and access types. By way of illustration, the mobile device 106 may be configured to operate in accordance with any of a number of first, second, third, fourth, fifth-generation communication protocols and/or the like. For example, the mobile device 106 may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols such as Long-Term Evolution (LTE), fifth-generation (5G) wireless communication protocols, Bluetooth Low Energy (BLE) communication protocols such as Bluetooth 5.0, ultra-wide-band (UWB) communication protocols, and/or the like. The mobile device 106 may also be configured to operate in accordance with non-cellular communication mechanisms, such as via a wireless local area network (WLAN) or other communication/data networks.

The communication interface 150 may also include a payment network interface. The payment network interface may include software, such as encryption software, and hardware, such as a modem, for communicating information to and/or from one or more devices on a network. For example, the mobile device 106 may be configured so that it can be used as a credit or debit card by, for example, wirelessly communicating account numbers or other authentication information to a terminal of the network. Such communication could be performed via transmission over a wireless communication protocol such as the Near-field communication protocol.

The mobile device 106 further includes a power source 128, such as a battery, for powering various circuits and other devices that are used to operate the mobile device 106. Embodiments of the mobile device 106 may also include a clock or other timer configured to determine and, in some cases, communicate actual or relative time to the processing device 120 or one or more other devices. For further example, the clock may facilitate timestamping transmissions, receptions, and other data for security, authentication, logging, polling, data expiry, and forensic purposes.

System 100 as illustrated diagrammatically represents at least one example of a possible implementation, where alternatives, additions, and modifications are possible for performing some or all of the described methods, operations and functions. Although shown separately, in some embodiments, two or more systems, servers, or illustrated components may utilized. In some implementations, the functions of one or more systems, servers, or illustrated components may be provided by a single system or server. In some embodiments, the functions of one illustrated system or server may be provided by multiple systems, servers, or computing devices, including those physically located at a central facility, those logically local, and those located as remote with respect to each other.

The enterprise system 200 can offer any number or type of services and products to one or more users 110. In some examples, an enterprise system 200 offers products. In some examples, an enterprise system 200 offers services. Use of "service(s)" or "product(s)" thus relates to either or both in these descriptions. With regard, for example, to online information and financial services, "service" and "product" are sometimes termed interchangeably. In non-limiting examples, services and products include retail services and products, information services and products, custom services and products, predefined or pre-offered services and products, consulting services and products, advising services and products, forecasting services and products, internet products and services, social media, and financial services and products, which may include, in non-limiting examples, services and products relating to banking, checking, savings, investments, credit cards, automatic-teller machines, debit cards, loans, mortgages, personal accounts, business accounts, account management, credit reporting, credit requests, and credit scores.

To provide access to, or information regarding, some or all the services and products of the enterprise system 200, automated assistance may be provided by the enterprise system 200. For example, automated access to user accounts and replies to inquiries may be provided by enterprise-side automated voice, text, and graphical display communications and interactions. In at least some examples, any number of human agents 210, can be employed, utilized, authorized or referred by the enterprise system 200. Such human agents 210 can be, as non-limiting examples, point of sale or point of service (POS) representatives, online customer service assistants available to users 110, advisors, managers, sales team members, and referral agents ready to route user requests and communications to preferred or particular other agents, human or virtual.

Human agents 210 may utilize agent devices 212 to serve users in their interactions to communicate and take action. The agent devices 212 can be, as non-limiting examples, computing devices, kiosks, terminals, smart devices such as phones, and devices and tools at customer service counters and windows at POS locations. In at least one example, the diagrammatic representation of the components of the user device 106 in FIG. 1 applies as well to one or both of the computing device 104 and the agent devices 212.

Agent devices 212 individually or collectively include input devices and output devices, including, as non-limiting examples, a touch screen, which serves both as an output device by providing graphical and text indicia and presentations for viewing by one or more agent 210, and as an input device by providing virtual buttons, selectable options, a virtual keyboard, and other indicia that, when touched or activated, control or prompt the agent device 212 by action of the attendant agent 210. Further non-limiting examples include, one or more of each, any, and all of a keyboard, a mouse, a touchpad, a joystick, a button, a switch, a light, an LED, a microphone serving as input device for example for voice input by a human agent 210, a speaker serving as an output device, a camera serving as an input device, a buzzer, a bell, a printer and/or other user input devices and output devices for use by or communication with a human agent 210 in accessing, using, and controlling, in whole or in part, the agent device 212.

Inputs by one or more human agents 210 can thus be made via voice, text or graphical indicia selections. For example, some inputs received by an agent device 212 in some examples correspond to, control, or prompt enterprise-side actions and communications offering services and products of the enterprise system 200, information thereof, or access thereto. At least some outputs by an agent device 212 in some examples correspond to, or are prompted by, user-side actions and communications in two-way communications between a user 110 and an enterprise-side human agent 210.

From a user perspective experience, an interaction in some examples within the scope of these descriptions begins with direct or first access to one or more human agents 210 in person, by phone, or online for example via a chat session or website function or feature. In other examples, a user is first assisted by a virtual agent 214 of the enterprise system 200, which may satisfy user requests or prompts by voice, text, or online functions, and may refer users to one or more human agents 210 once preliminary determinations or conditions are made or met.

A computing system 206 of the enterprise system 200 may include components such as, at least one of each of a processing device 220, and a memory device 222 for processing use, such as random access memory (RAM), and read-only memory (ROM). The illustrated computing system 206 further includes a storage device 224 including at least one non-transitory storage medium, such as a micro-drive, for long-term, intermediate-term, and short-term storage of computer-readable instructions 226 for execution by the processing device 220. For example, the instructions 226 can include instructions for an operating system and various applications or programs 230, of which the application 232 is represented as a particular example. The storage device 224 can store various other data 234, which can include, as non-limiting examples, cached data, and files such as those for user accounts, user profiles, account balances, and transaction histories, files downloaded or received from other devices, and other data items preferred by the user or required or related to any or all of the applications or programs 230.

The computing system 206, in the illustrated example, includes an input/output system 236, referring to, including, or operatively coupled with input devices and output devices such as, in a non-limiting example, agent devices 212, which have both input and output capabilities.

In the illustrated example, a system intraconnect 238 electrically connects the various above-described components of the computing system 206. In some cases, the intraconnect 238 operatively couples components to one another, which indicates that the components may be directly or indirectly connected, such as by way of one or more intermediate components. The intraconnect 238, in various non-limiting examples, can include or represent, a system bus, a high-speed interface connecting the processing device 220 to the memory device 222, individual electrical connections among the components, and electrical conductive traces on a motherboard common to some or all of the above-described components of the user device.

The computing system 206, in the illustrated example, includes a communication interface 250, by which the computing system 206 communicates and conducts transactions with other devices and systems. The communication interface 250 may include digital signal processing circuitry and may provide two-way communications and data exchanges, for example wirelessly via wireless device 252, and for an additional or alternative example, via wired or docked communication by mechanical electrically conductive connector 254. Communications may be conducted via various modes or protocols, of which GSM voice calls, SMS, EMS, MMS messaging, TDMA, CDMA, PDC, WCDMA, CDMA2000, and GPRS, are all non-limiting and non-exclusive examples. Thus, communications can be conducted, for example, via the wireless device 252, which can be or include a radio-frequency transceiver, a Bluetooth device, Wi-Fi device, Near-field communication device, and other transceivers. In addition, GPS (Global Positioning System) may be included for navigation and location-related data exchanges, ingoing and/or outgoing. Communications may also or alternatively be conducted via the connector 254 for wired connections such as by USB, Ethernet, and other physically connected modes of data transfer.

The processing device 220, in various examples, can operatively perform calculations, can process instructions for execution, and can manipulate information. The processing device 220 can execute machine-executable instructions stored in the storage device 224 and/or memory device 222 to thereby perform methods and functions as described or implied herein, for example by one or more corresponding flow charts expressly provided or implied as would be understood by one of ordinary skill in the art to which the subjects matters of these descriptions pertain. The processing device 220 can be or can include, as non-limiting examples, a central processing unit (CPU), a microprocessor, a graphics processing unit (GPU), a microcontroller, an application-specific integrated circuit (ASIC), a programmable logic device (PLD), a digital signal processor (DSP), a field programmable gate array (FPGA), a state machine, a controller, gated or transistor logic, discrete physical hardware components, and combinations thereof.

Furthermore, the computing device 206, may be or include a workstation, a server, or any other suitable device, including a set of servers, a cloud-based application or system, or any other suitable system, adapted to execute, for example any suitable operating system, including Linux, UNIX, Windows, macOS, IOS, Android, and any known other operating system used on personal computer, central computing systems, phones, and other devices.

The user devices, referring to either or both of the computing device 104 and mobile device 106, the agent devices 212, and the enterprise computing system 206, which may be one or any number centrally located or distributed, are in communication through one or more networks, referenced as network 258 in FIG. 1.

Network 258 provides wireless or wired communications among the components of the system 100 and the environment thereof, including other devices local or remote to those illustrated, such as additional mobile devices, servers, and other devices communicatively coupled to network 258, including those not illustrated in FIG. 1. The network 258 is singly depicted for illustrative convenience, but may include more than one network without departing from the scope of these descriptions. In some embodiments, the network 258 may be or provide one or more cloud-based services or operations. The network 258 may be or include an enterprise or secured network, or may be implemented, at least in part, through one or more connections to the Internet. A portion of the network 258 may be a virtual private network (VPN) or an Intranet. The network 258 can include wired and wireless links, including, as non-limiting examples, 802.11a/b/g/n/ac, 802.20, WiMax, LTE, and/or any other wireless link. The network 258 may include any internal or external network, networks, sub-network, and combinations of such operable to implement communications between various computing components within and beyond the illustrated environment 100. The network 258 may communicate, for example, Internet Protocol (IP) packets, Frame Relay frames, Asynchronous Transfer Mode (ATM) cells, voice, video, data, and other suitable information between network addresses. The network 258 may also include one or more local area networks (LANs), radio access networks (RANs), metropolitan area networks (MANs), wide area networks (WANs), all or a portion of the internet and/or any other communication system or systems at one or more locations.

The network 258 may incorporate a cloud platform/data center that support various service models including Platform as a Service (PaaS), Infrastructure-as-a-Service (IaaS), and Software-as-a-Service (SaaS). Such service models may provide, for example, a digital platform accessible to the user device (referring to either or both of the computing device 104 and the mobile device 106). Specifically, SaaS may provide a user with the capability to use applications running on a cloud infrastructure, where the applications are accessible via a thin client interface such as a web browser and the user is not permitted to manage or control the underlying cloud infrastructure (i.e., network, servers, operating systems, storage, or specific application capabilities that are not user-specific). PaaS also do not permit the user to manage or control the underlying cloud infrastructure, but this service may enable a user to deploy user-created or acquired applications onto the cloud infrastructure using programming languages and tools provided by the provider of the application. In contrast, IaaS provides a user the permission to provision processing, storage, networks, and other computing resources as well as run arbitrary software (e.g., operating systems and applications) thereby giving the user control over operating systems, storage, deployed applications, and potentially select networking components (e.g., host firewalls).

The network 258 may also incorporate various cloud-based deployment models including private cloud (i.e., an organization-based cloud managed by either the organization or third parties and hosted on-premises or off premises), public cloud (i.e., cloud-based infrastructure available to the general public that is owned by an organization that sells cloud services), community cloud (i.e., cloud-based infrastructure shared by several organizations and manages by the organizations or third parties and hosted on-premises or off premises), and/or hybrid cloud (i.e., composed of two or more clouds e.g., private community, and/or public).

Two external systems 202 and 204 are expressly illustrated in FIG. 1, representing any number and variety of data sources, users, consumers, customers, business entities, banking systems, government entities, clubs, and groups of any size are all within the scope of the descriptions. In at least one example, the external systems 202 and 204 represent automatic teller machines (ATMs) utilized by the enterprise system 200 in serving users 110. In another example, the external systems 202 and 204 represent payment clearinghouse or payment rail systems for processing payment transactions, and in another example, the external systems 202 and 204 represent third party systems such as merchant systems configured to interact with the user device 106 during transactions and also configured to interact with the enterprise system 200 in back-end transactions clearing processes.

The network 258 can be configured to communicate with the external systems 202 and 204, which can host third-party databases, and the enterprise system 200 can receive information from those third-party databases as part of a data aggregation process. In an embodiment, the network 258 can relay database queries generated by the computing system 200 in order to receive information from the external systems 202 and 204. The network 258 then transmits the information received from the external systems 202 and 204 to other elements within the computing system 200. Queries relayed by the network can request object data related to third-party objects. Third-party objects include credit cards, debit cards, virtual methods of payment, cryptocurrency, or other methods of peer-to-peer financial transactions that are offered or otherwise serviced by third parties. Further, the object data can include information about the third-party objects such as the benefits or rewards that a user could earn if they use such third-party objects to make purchases. In some embodiments, the object data can also include information about the type of credit score that a consumer would need in order to qualify for the third-party object, the duration of any promotion that provides the benefits or rewards (e.g., a six-month introductory promotion), any applicable interest rates, store-specific or purchase-category-specific information (e.g., if you shop at a specific store what would benefit would the consumer receive if they use the card at that store, if the consumer makes purchases that fall under a certain category such as food, entertainment, etc. what benefit would the consumer receive if they use the card, etc.), any fees that a consumer would need to pay to sign up for the third-party object, if a certain income level is needed to qualify for the third-party object, etc. The queries may also be related to action-based outcomes obtainable via use of the third-party objects (e.g. cashback rewards, airline miles, hotel points, etc.). The computing system 200 can store the received third-party object data in the storage device 224 to be used for analysis in order to make predictions about what third-party product to recommend to a customer of the enterprise that operates the enterprise system 200. For example, the system may classify the object data in accordance with indexing rules so that the data can be more easily analyzed and evaluated in order to generate a prioritization list that would prioritize third party objects that could be recommended to a user.

In certain embodiments, one or more of the systems such as the user device (referring to either or both of the computing device 104 and the mobile device 106), the enterprise system 200, and/or the external systems 202 and 204 are, include, or utilize virtual resources. In some cases, such virtual resources are considered cloud resources or virtual machines. The cloud computing configuration may provide an infrastructure that includes a network of interconnected nodes and provides stateless, low coupling, modularity, and semantic interoperability. Such interconnected nodes may incorporate a computer system that includes one or more processors, a memory, and a bus that couples various system components (e.g., the memory) to the processor. Such virtual resources may be available for shared use among multiple distinct resource consumers and in certain implementations, virtual resources do not necessarily correspond to one or more specific pieces of hardware, but rather to a collection of pieces of hardware operatively coupled within a cloud computing configuration so that the resources may be shared as needed.

As used herein, an artificial intelligence system, artificial intelligence algorithm, artificial intelligence module, program, and the like, generally refer to computer implemented programs that are suitable to simulate intelligent behavior (i.e., intelligent human behavior) and/or computer systems and associated programs suitable to perform tasks that typically require a human to perform, such as tasks requiring visual perception, speech recognition, decision-making, translation, and the like. An artificial intelligence system may include, for example, at least one of a series of associated if-then logic statements, a statistical model suitable to map raw sensory data into symbolic categories and the like, or a machine learning program. A machine learning program, machine learning algorithm, or machine learning module, as used herein, is generally a type of artificial intelligence including one or more algorithms that can learn and/or adjust parameters based on input data provided to the algorithm. In some instances, machine learning programs, algorithms, and modules are used at least in part in implementing artificial intelligence (AI) functions, systems, and methods.

Artificial Intelligence and/or machine learning programs may be associated with or conducted by one or more processors, memory devices, and/or storage devices of a computing system or device. It should be appreciated that the AI algorithm or program may be incorporated within the existing system architecture or be configured as a standalone modular component, controller, or the like communicatively coupled to the system. An AI program and/or machine learning program may generally be configured to perform methods and functions as described or implied herein, for example by one or more corresponding flow charts expressly provided or implied as would be understood by one of ordinary skill in the art to which the subjects matters of these descriptions pertain.

A machine learning program may be configured to use various analytical tools (e.g., algorithmic applications) to leverage data to make predictions or decisions. Machine learning programs may be configured to implement various algorithmic processes and learning approaches including, for example, decision tree learning, association rule learning, artificial neural networks, recurrent artificial neural networks, long short term memory networks, inductive logic programming, support vector machines, clustering, Bayesian networks, reinforcement learning, representation learning, similarity and metric learning, sparse dictionary learning, genetic algorithms, k-nearest neighbor (KNN), and the like. In some embodiments, the machine learning algorithm may include one or more image recognition algorithms suitable to determine one or more categories to which an input, such as data communicated from a visual sensor or a file in JPEG, PNG or other format, representing an image or portion thereof, belongs. Additionally or alternatively, the machine learning algorithm may include one or more regression algorithms configured to output a numerical value given an input. Further, the machine learning may include one or more pattern recognition algorithms, e.g., a module, subroutine or the like capable of translating text or string characters and/or a speech recognition module or subroutine. In various embodiments, the machine learning module may include a machine learning acceleration logic, e.g., a fixed function matrix multiplication logic, in order to implement the stored processes and/or optimize the machine learning logic training and interface.

Machine learning models are trained using various data inputs and techniques. Example training methods may include, for example, supervised learning, (e.g., decision tree learning, support vector machines, similarity and metric learning, etc.), unsupervised learning, (e.g., association rule learning, clustering, etc.), reinforcement learning, semi-supervised learning, self-supervised learning, multi-instance learning, inductive learning, deductive inference, transductive learning, sparse dictionary learning and the like. Example clustering algorithms used in unsupervised learning may include, for example, k-means clustering, density based special clustering of applications with noise (DB-SCAN), mean shift clustering, expectation maximization (EM) clustering using Gaussian mixture models (GMM), agglomerative hierarchical clustering, or the like. According to one embodiment, clustering of data may be performed using a cluster model to group data points based on certain similarities using unlabeled data. Example cluster models may include, for example, connectivity models, centroid models, distribution models, density models, group models, graph based models, neural models and the like.

One subfield of machine learning includes neural networks, which take inspiration from biological neural networks. In machine learning, a neural network includes interconnected units that process information by responding to external inputs to find connections and derive meaning from undefined data. A neural network can, in a sense, learn to perform tasks by interpreting numerical patterns that take the shape of vectors and by categorizing data based on similarities, without being programmed with any task-specific rules. A neural network generally includes connected units, neurons, or nodes (e.g., connected by synapses) and may allow for the machine learning program to improve performance. A neural network may define a network of functions, which have a graphical relationship. Various neural networks that implement machine learning exist including, for example, feedforward artificial neural networks, perceptron and multilayer perceptron neural networks, radial basis function artificial neural networks, recurrent artificial neural networks, modular neural networks, long short term memory networks, as well as various other neural networks.

Neural networks may perform a supervised learning process where known inputs and known outputs are utilized to categorize, classify, or predict a quality of a future input. However, additional or alternative embodiments of the machine learning program may be trained utilizing unsupervised or semi-supervised training, where none of the outputs or some of the outputs are unknown, respectively. Typically, a machine learning algorithm is trained (e.g., utilizing a training data set) prior to modeling the problem with which the algorithm is associated. Supervised training of the neural network may include choosing a network topology suitable for the problem being modeled by the network and providing a set of training data representative of the problem. Generally, the machine learning algorithm may adjust the weight coefficients until any error in the output data generated by the algorithm is less than a predetermined, acceptable level. For instance, the training process may include comparing the generated output produced by the network in response to the training data with a desired or correct output. An associated error amount may then be determined for the generated output data, such as for each output data point generated in the output layer. The associated error amount may be communicated back through the system as an error signal, where the weight coefficients assigned in the hidden layer are adjusted based on the error signal. For instance, the associated error amount (e.g., a value between −1 and 1) may be used to modify the previous coefficient, e.g., a propagated value. The machine learning algorithm may be considered sufficiently trained when the associated error amount for the output data is less than the predetermined, acceptable level (e.g., each data point within the output layer includes an error amount less than the predetermined, acceptable level). Thus, the parameters determined from the training process can be utilized with new input data to categorize, classify, and/or predict other values based on the new input data.

An artificial neural network (ANN), also known as a feedforward network, may be utilized, e.g., an acyclic graph with nodes arranged in layers. A feedforward network (see, e.g., feedforward network 260 referenced in FIG. 2A) may include a topography with a hidden layer 264 between an input layer 262 and an output layer 266. The input layer 262, having nodes commonly referenced in FIG. 2A as input nodes 272 for convenience, communicates input data, variables, matrices, or the like to the hidden layer 264, having nodes 274. The hidden layer 264 generates a representation and/or transformation of the input data into a form that is suitable for generating output data. Adjacent layers of the topography are connected at the edges of the nodes of the respective layers, but nodes within a layer typically are not separated by an edge. In at least one embodiment of such a feedforward network, data is communicated to the nodes 272 of the input layer, which then communicates the data to the hidden layer 264. The hidden layer 264 may be configured to determine the state of the nodes in the respective layers and assign weight coefficients or parameters of the nodes based on the edges separating each of the layers, e.g., an activation function implemented between the input data communicated from the input layer 262 and the output data communicated to the nodes 276 of the output layer 266. It should be appreciated that the form of the output from the neural network may generally depend on the type of model represented by the algorithm. Although the feedforward network 260 of FIG. 2A expressly includes a single hidden layer 264, other embodiments of feedforward networks within the scope of the descriptions can include any number of hidden layers. The hidden layers are intermediate the input and output layers and are generally where all or most of the computation is done.

An additional or alternative type of neural network suitable for use in the machine learning program and/or module is a Convolutional Neural Network (CNN). A CNN is a type of feedforward neural network that may be utilized to model data associated with input data having a grid-like topology. In some embodiments, at least one layer of a CNN may include a sparsely connected layer, in which each output of a first hidden layer does not interact with each input of the next hidden layer. For example, the output of the convolution in the first hidden layer may be an input of the next hidden layer, rather than a respective state of each node of the first layer. CNNs are typically trained for pattern recognition, such as speech processing, language processing, and visual processing. As such, CNNs may be particularly useful for implementing optical and pattern recognition programs required from the machine learning program. A CNN includes an input layer, a hidden layer, and an output layer, typical of feedforward networks, but the nodes of a CNN input layer are generally organized into a set of categories via feature detectors and based on the receptive fields of the sensor, retina, input layer, etc. Each filter may then output data from its respective nodes to corresponding nodes of a subsequent layer of the network. A CNN may be configured to apply the convolution mathematical operation to the respective nodes of each filter and communicate the same to the corresponding node of the next subsequent layer. As an example, the input to the convolution layer may be a multidimensional array of data. The convolution layer, or hidden layer, may be a multidimensional array of parameters determined while training the model.

Figures 2A, 2B, 2C:
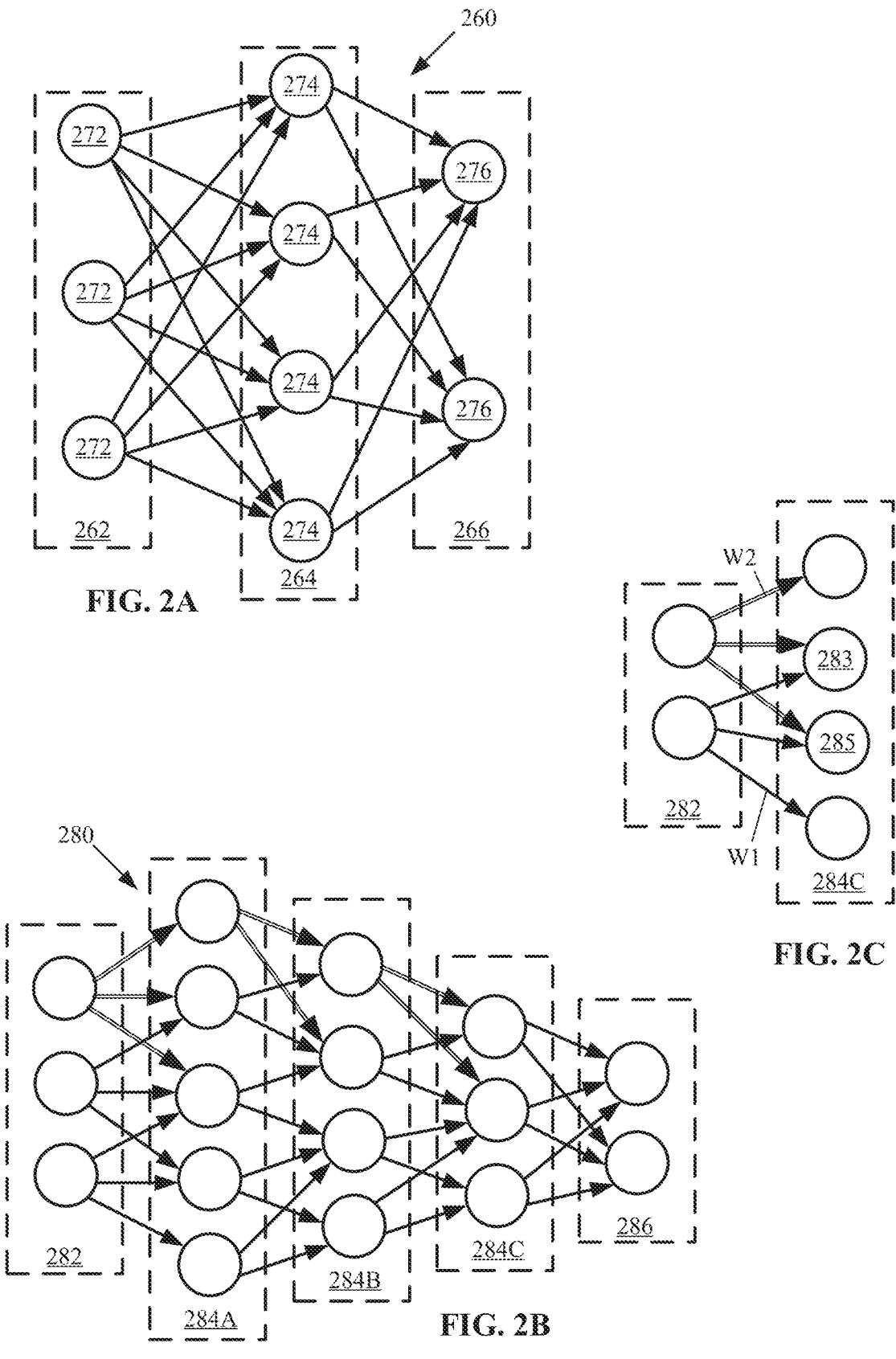
FIG. 2A is a diagram of a feedforward network, according to at least one embodiment, utilized in machine learning.
FIG. 2B is a diagram of a convolution neural network, according to at least one embodiment, utilized in machine learning.
FIG. 2C is a diagram of a portion of the convolution neural network of FIG. 2B, according to at least one embodiment, illustrating assigned weights at connections or neurons.

An exemplary convolutional neural network CNN is depicted and referenced as 280 in FIG. 2B. As in the basic feedforward network 260 of FIG. 2A, the illustrated example of FIG. 2B has an input layer 282 and an output layer 286. However where a single hidden layer 264 is represented in FIG. 2A, multiple consecutive hidden layers 284A, 284B, and 284C are represented in FIG. 2B. The edge neurons represented by white-filled arrows highlight that hidden layer nodes can be connected locally, such that not all nodes of succeeding layers are connected by neurons. FIG. 2C, representing a portion of the convolutional neural network 280 of FIG. 2B, specifically portions of the input layer 282 and the first hidden layer 284A, illustrates that connections can be weighted. In the illustrated example, labels W1 and W2 refer to respective assigned weights for the referenced connections. Two hidden nodes 283 and 285 share the same set of weights W1 and W2 when connecting to two local patches.

Figure 3:
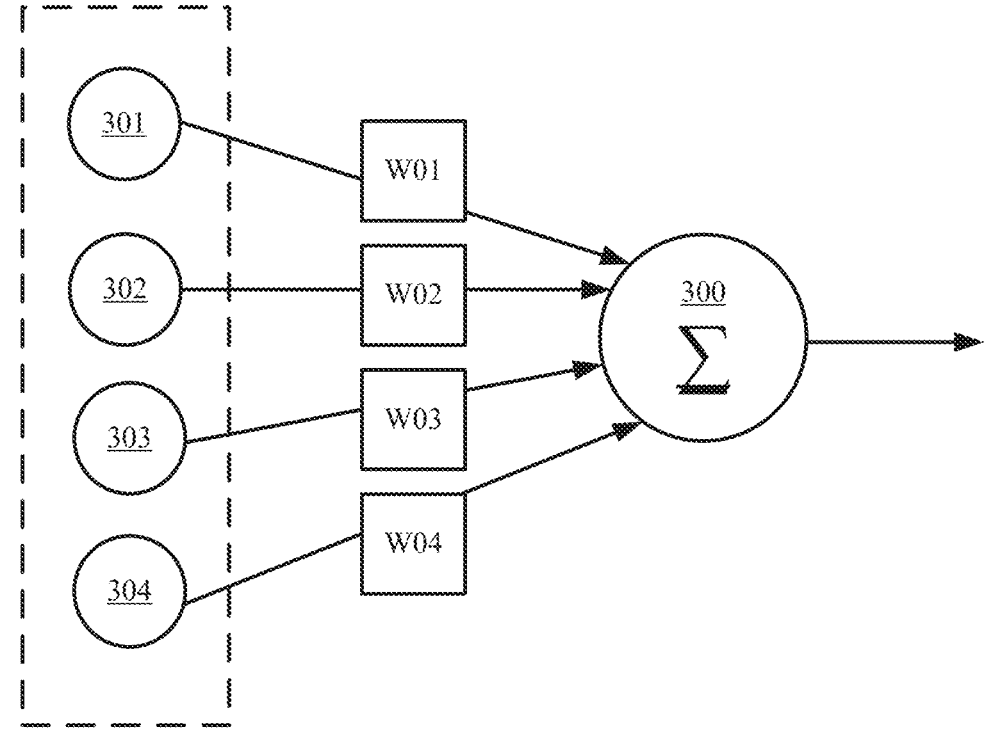
FIG. 3 is a diagram representing an exemplary weighted sum computation in a node in an artificial neural network.

Weight defines the impact a node in any given layer has on computations by a connected node in the next layer. FIG. 3 represents a particular node 300 in a hidden layer. The node 300 is connected to several nodes in the previous layer representing inputs to the node 300. The input nodes 301, 302, 303 and 304 are each assigned a respective weight W01, W02, W03, and W04 in the computation at the node 300, which in this example is a weighted sum.

An additional or alternative type of feedforward neural network suitable for use in the machine learning program and/or module is a Recurrent Neural Network (RNN). An RNN may allow for analysis of sequences of inputs rather than only considering the current input data set. RNNs typically include feedback loops/connections between layers of the topography, thus allowing parameter data to be communicated between different parts of the neural network. RNNs typically have an architecture including cycles, where past values of a parameter influence the current calculation of the parameter, e.g., at least a portion of the output data from the RNN may be used as feedback/input in calculating subsequent output data. In some embodiments, the machine learning module may include an RNN configured for language processing, e.g., an RNN configured to perform statistical language modeling to predict the next word in a string based on the previous words. The RNN(s) of the machine learning program may include a feedback system suitable to provide the connection(s) between subsequent and previous layers of the network.

Figure 4:
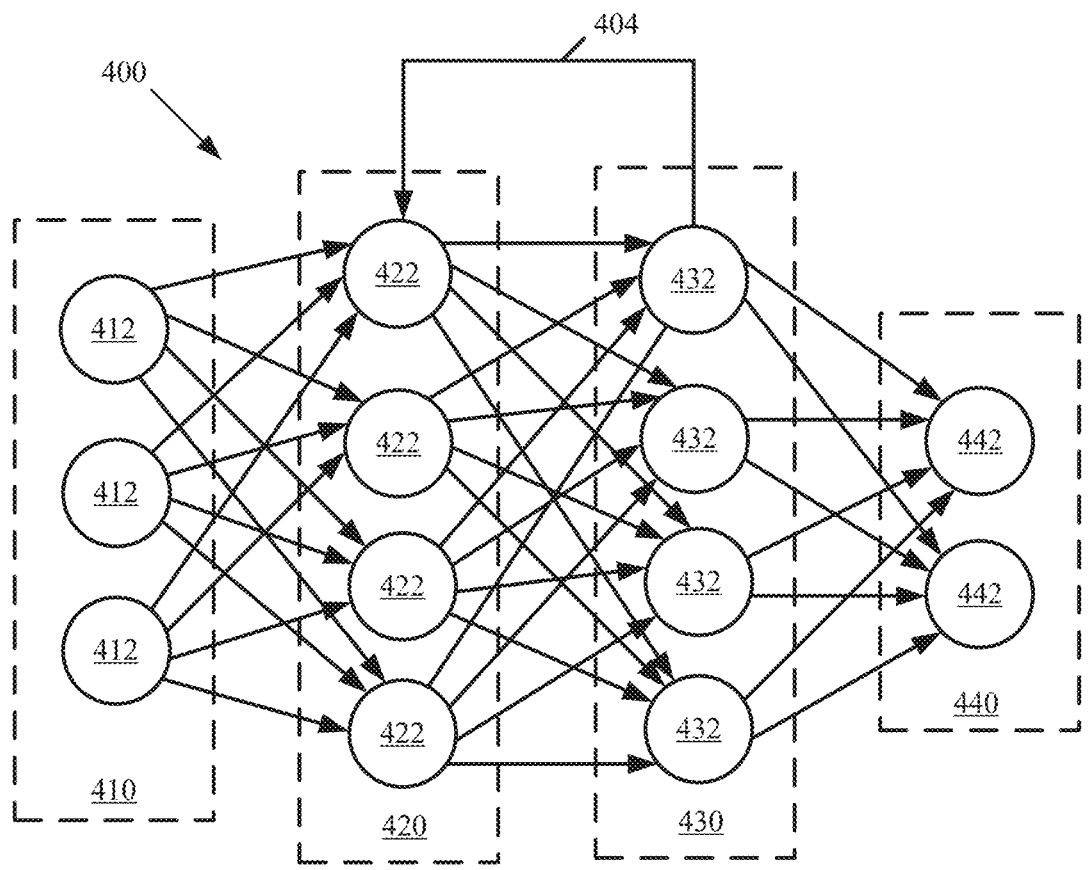
FIG. 4 is a diagram of a Recurrent Neural Network RNN, according to at least one embodiment, utilized in machine learning.

An example for a Recurrent Neural Network RNN is referenced as 400 in FIG. 4. As in the basic feedforward network 260 of FIG. 2A, the illustrated example of FIG. 4 has an input layer 410 (with nodes 412) and an output layer 440 (with nodes 442). However, where a single hidden layer 264 is represented in FIG. 2A, multiple consecutive hidden layers 420 and 430 are represented in FIG. 4 (with nodes 422 and nodes 432, respectively). As shown, the RNN 400 includes a feedback connector 404 configured to communicate parameter data from at least one node 432 from the second hidden layer 430 to at least one node 422 of the first hidden layer 420. It should be appreciated that two or more and up to all of the nodes of a subsequent layer may provide or communicate a parameter or other data to a previous layer of the RNN 400. Moreover and in some embodiments, the RNN 400 may include multiple feedback connectors 404 (e.g., connectors 404 suitable to communicatively couple pairs of nodes and/or connector systems 404 configured to provide communication between three or more nodes). Additionally or alternatively, the feedback connector 404 may communicatively couple two or more nodes having at least one hidden layer between them, i.e., nodes of nonsequential layers of the RNN 400.

In an additional or alternative embodiment, the machine-learning program may include one or more support vector machines. A support vector machine may be configured to determine a category to which input data belongs. For example, the machine-learning program may be configured to define a margin using a combination of two or more of the input variables and/or data points as support vectors to maximize the determined margin. Such a margin may generally correspond to a distance between the closest vectors that are classified differently. The machine-learning program may be configured to utilize a plurality of support vector machines to perform a single classification. For example, the machine-learning program may determine the category to which input data belongs using a first support vector determined from first and second data points/variables, and the machine-learning program may independently categorize the input data using a second support vector determined from third and fourth data points/variables. The support vector machine(s) may be trained similarly to the training of neural networks, e.g., by providing a known input vector (including values for the input variables) and a known output classification. The support vector machine is trained by selecting the support vectors and/or a portion of the input vectors that maximize the determined margin.

As depicted, and in some embodiments, the machine-learning program may include a neural network topography having more than one hidden layer. In such embodiments, one or more of the hidden layers may have a different number of nodes and/or the connections defined between layers. In some embodiments, each hidden layer may be configured to perform a different function. As an example, a first layer of the neural network may be configured to reduce a dimensionality of the input data, and a second layer of the neural network may be configured to perform statistical programs on the data communicated from the first layer. In various embodiments, each node of the previous layer of the network may be connected to an associated node of the subsequent layer (dense layers). Generally, the neural network(s) of the machine-learning program may include a relatively large number of layers, e.g., three or more layers, and may be referred to as deep neural networks. For example, the node of each hidden layer of a neural network may be associated with an activation function utilized by the machine-learning program to generate an output received by a corresponding node in the subsequent layer. The last hidden layer of the neural network communicates a data set (e.g., the result of data processed within the respective layer) to the output layer. Deep neural networks may require more computational time and power to train, but the additional hidden layers provide multistep pattern recognition capability and/or reduced output error relative to simple or shallow machine learning architectures (e.g., including only one or two hidden layers).

According to various implementations, deep neural networks incorporate neurons, synapses, weights, biases, and functions and can be trained to model complex non-linear relationships. Various deep learning frameworks may include, for example, TensorFlow, MxNet, PyTorch, Keras, Gluon, and the like. Training a deep neural network may include complex input/output transformations and may include, according to various embodiments, a backpropagation algorithm. According to various embodiments, deep neural networks may be configured to classify images of handwritten digits from a dataset or various other images. According to various embodiments, the datasets may include a collection of files that are unstructured and lack predefined data model schema or organization. Unlike structured data, which is usually stored in a relational database (RDBMS) and can be mapped into designated fields, unstructured data comes in many formats that can be challenging to process and analyze. Examples of unstructured data may include, according to non-limiting examples, dates, numbers, facts, emails, text files, scientific data, satellite imagery, media files, social media data, text messages, mobile communication data, and the like.

Figure 5:
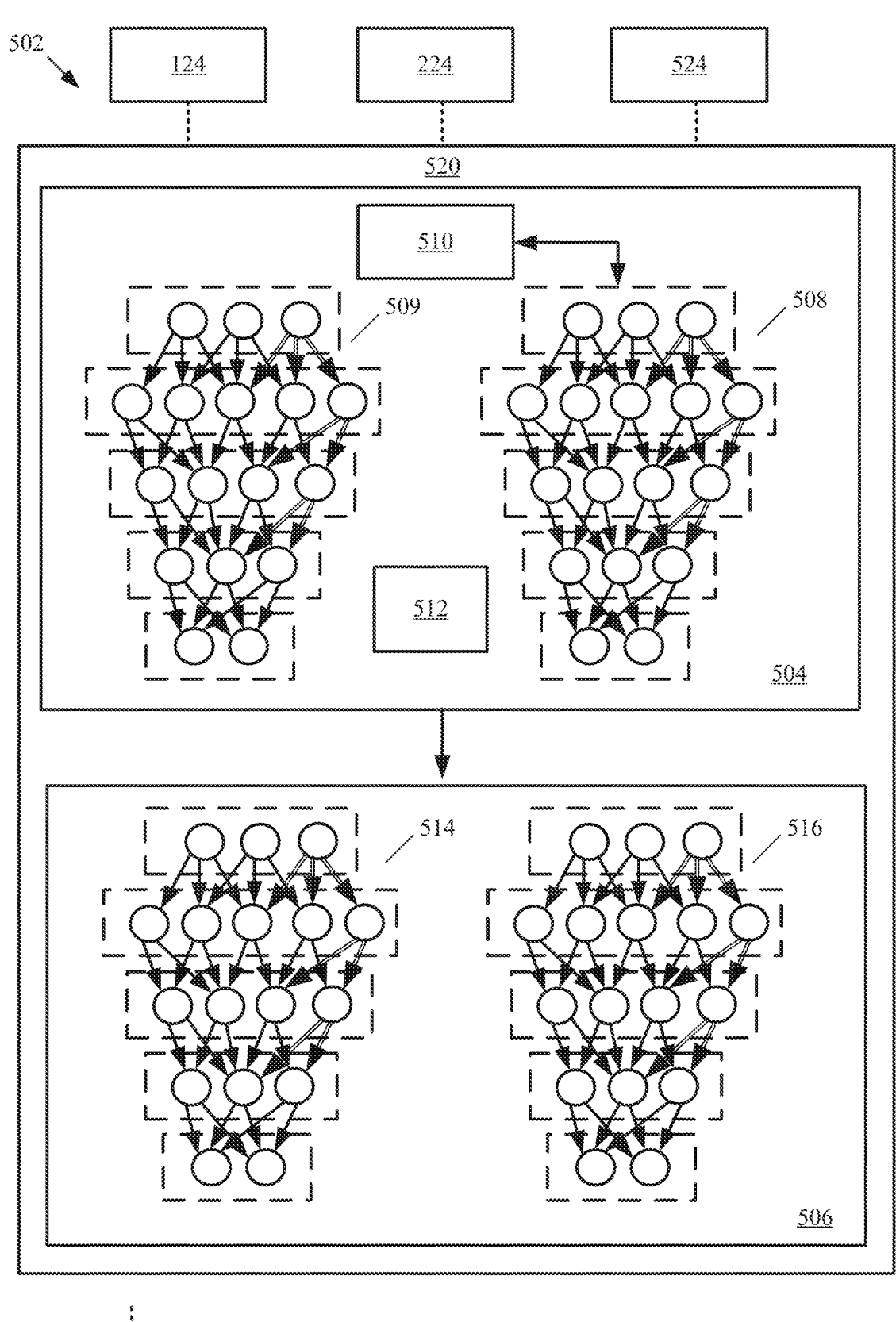
FIG. 5 is a schematic logic diagram of an artificial intelligence program including a front-end and a back-end algorithm.

Referring now to FIG. 5 and some embodiments, an AI program 502 may include a front-end algorithm 504 and a back-end algorithm 506. The artificial intelligence program 502 may be implemented on an AI processor 520, such as the processing device 120, the processing device 220, and/or a dedicated processing device. The instructions associated with the front-end algorithm 504 and the back-end algorithm 506 may be stored in an associated memory device and/or storage device of the system (e.g., storage device 124, memory device 122, storage device 224, and/or memory device 222) communicatively coupled to the AI processor 520, as shown. Additionally or alternatively, the system may include one or more memory devices and/or storage devices (represented by memory 524 in FIG. 5) for processing use and/or including one or more instructions necessary for operation of the AI program 502. In some embodiments, the AI program 502 may include a deep neural network (e.g., a front-end network 504 configured to perform pre-processing, such as feature recognition, and a back-end network 506 configured to perform an operation on the data set communicated directly or indirectly to the back-end network 506). For instance, the front-end program 506 can include at least one CNN 508 communicatively coupled to send output data to the back-end network 506.

Additionally or alternatively, the front-end program 504 can include one or more AI algorithms 510, 512 (e.g., statistical models or machine learning programs such as decision tree learning, associate rule learning, recurrent artificial neural networks, support vector machines, and the like). In various embodiments, the front-end program 504 may be configured to include built in training and inference logic or suitable software to train the neural network prior to use (e.g., machine learning logic including, but not limited to, image recognition, mapping and localization, autonomous navigation, speech synthesis, document imaging, or language translation such as natural language processing). For example, a CNN 508 and/or AI algorithm 510 may be used for image recognition, input categorization, and/or support vector training. In some embodiments and within the front-end program 504, an output from an AI algorithm 510 may be communicated to a CNN 508 or 509, which processes the data before communicating an output from the CNN 508, 509 and/or the front-end program 504 to the back-end program 506. In various embodiments, the back-end network 506 may be configured to implement input and/or model classification, speech recognition, translation, and the like. For instance, the back-end network 506 may include one or more CNNs (e.g., CNN 514) or dense networks (e.g., dense networks 516), as described herein.

For instance and in some embodiments of the AI program 502, the program may be configured to perform unsupervised learning, in which the machine learning program performs the training process using unlabeled data, e.g., without known output data with which to compare. During such unsupervised learning, the neural network may be configured to generate groupings of the input data and/or determine how individual input data points are related to the complete input data set (e.g., via the front-end program 504). For example, unsupervised training may be used to configure a neural network to generate a self-organizing map, reduce the dimensionally of the input data set, and/or to perform outlier/anomaly determinations to identify data points in the data set that falls outside the normal pattern of the data. In some embodiments, the AI program 502 may be trained using a semi-supervised learning process in which some but not all of the output data is known, e.g., a mix of labeled and unlabeled data having the same distribution.

In some embodiments, the AI program 502 may be accelerated via a machine-learning framework 522 (e.g., hardware). The machine learning framework may include an index of basic operations, subroutines, and the like (primitives) typically implemented by AI and/or machine learning algorithms. Thus, the AI program 502 may be configured to utilize the primitives of the framework 522 to perform some or all of the calculations required by the AI program 502. Primitives suitable for inclusion in the machine learning framework 522 include operations associated with training a convolutional neural network (e.g., pools), tensor convolutions, activation functions, basic algebraic subroutines and programs (e.g., matrix operations, vector operations), numerical method subroutines and programs, and the like.

It should be appreciated that the machine-learning program may include variations, adaptations, and alternatives suitable to perform the operations necessary for the system, and the present disclosure is equally applicable to such suitably configured machine learning and/or artificial intel-
ligence programs, modules, etc. For instance, the machine-
learning program may include one or more long short-term
memory (LSTM) RNNs, convolutional deep belief net-
works, deep belief networks DBNs, and the like. DBNs, for
instance, may be utilized to pre-train the weighted charac-
teristics and/or parameters using an unsupervised learning
process. Further, the machine-learning module may include
one or more other machine learning tools (e.g., Logistic
Regression (LR), Naive-Bayes, Random Forest (RF), matrix
factorization, and support vector machines) in addition to, or
as an alternative to, one or more neural networks, as
described herein.

Figure 6:
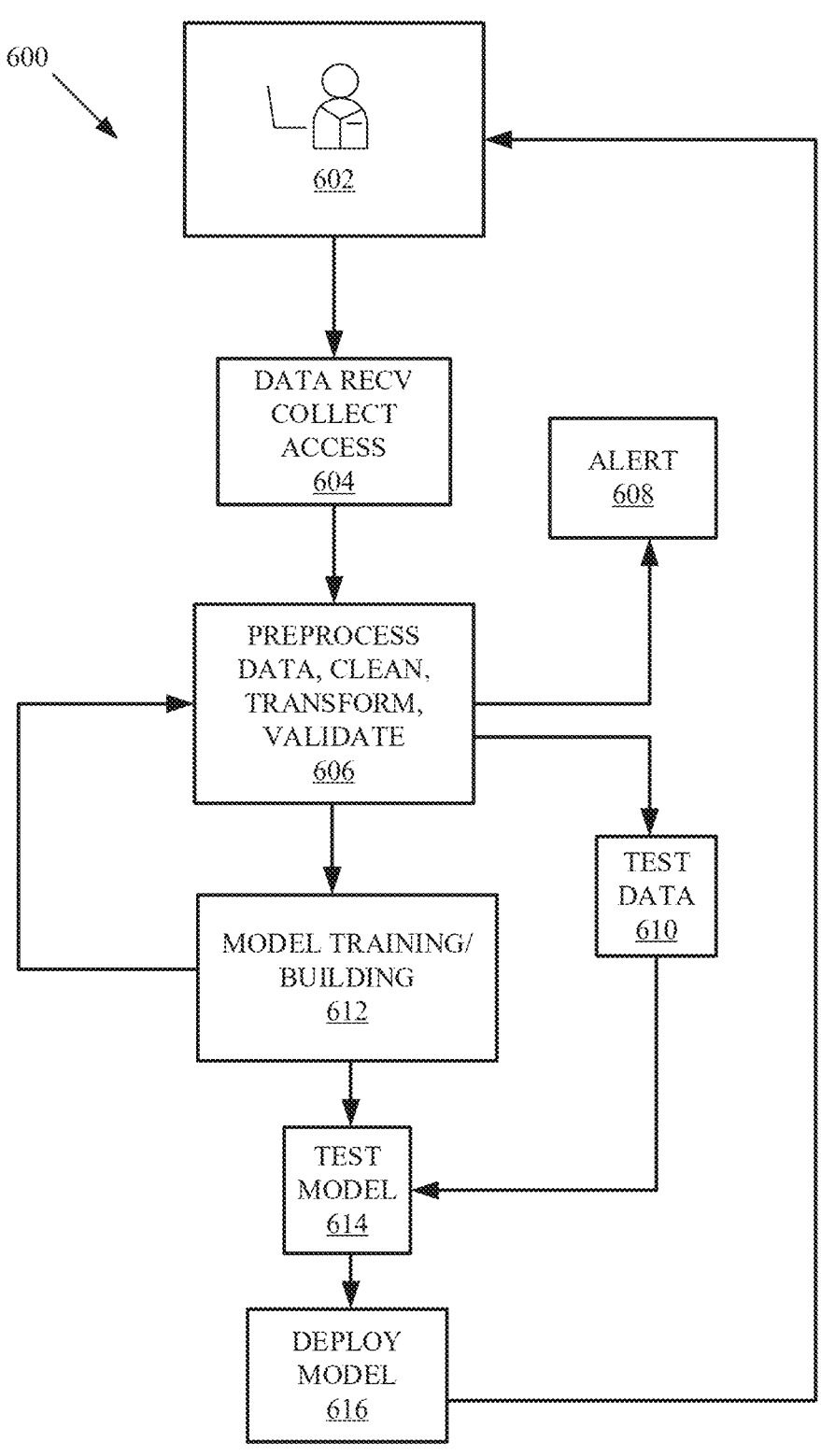
FIG. 6 is a flow chart representing a method, according to at least one embodiment, of model development and deployment by machine learning.

FIG. 6 is a flow chart representing a method 600, accord-
ing to at least one embodiment, of model development and
deployment by machine learning. The method 600 repre-
sents at least one example of a machine learning workflow
in which steps are implemented in a machine-learning
project.

In step 602, a user authorizes, requests, manages, or
initiates the machine-learning workflow. This may represent
a user such as human agent, or customer, requesting
machine-learning assistance or AI functionality to simulate
intelligent behavior (such as a virtual agent) or other
machine-assisted or computerized tasks that may, for
example, entail visual perception, speech recognition, deci-
sion-making, translation, forecasting, predictive modelling,
and/or suggestions as non-limiting examples. In a first
iteration from the user perspective, step 602 can represent a
starting point. However, with regard to continuing or
improving an ongoing machine learning workflow, step 602
can represent an opportunity for further user input or over-
sight via a feedback loop.

In step 604, data is received, collected, accessed, or
otherwise acquired and entered as can be termed data
ingestion. In step 606, the data ingested in step 604 is
pre-processed, for example, by cleaning, and/or transforma-
tion such as into a format that the following components can
digest. The incoming data may be versioned to connect a
data snapshot with the particularly resulting trained model.
As newly trained models are tied to a set of versioned data,
preprocessing steps are tied to the developed model. If new
data is subsequently collected and entered, a new model will
be generated. If the preprocessing step 606 is updated with
newly ingested data, an updated model will be generated.
Step 606 can include data validation, which focuses on
confirming that the statistics of the ingested data are as
expected, such as that data values are within expected
numerical ranges, that data sets are within any expected or
required categories, and that data comply with any needed
distributions such as within those categories. Step 606 can
proceed to step 608 to automatically alert the initiating user,
other human or virtual agents, and/or other systems, if any
anomalies are detected in the data, thereby pausing or
terminating the process flow until corrective action is taken.

In step 610, training test data such as a target variable
value is inserted into an iterative training and testing loop.
In step 612, model training, a core step of the machine
learning work flow, is implemented. A model architecture is
trained in the iterative training and testing loop. For
example, features in the training test data are used to train
the model based on weights and iterative calculations in
which the target variable may be incorrectly predicted in an
early iteration as determined by comparison in step 614,
where the model is tested. Subsequent iterations of the
model training, in step 612, may be conducted with updated
weights in the calculations.

When compliance and/or success in the model testing in
step 614 is achieved, process flow proceeds to step 616,
where model deployment is triggered. The model may be
utilized in AI functions and programming, for example to
simulate intelligent behavior, to perform machine-assisted
or computerized tasks, of which visual perception, speech
recognition, decision-making, translation, forecasting, pre-
dictive modelling, and/or automated suggestion generation
serve as non-limiting examples.

Systems and methods disclosed herein involve data aggre-
gation, data formatting and standardization, as well as data
compression in order to prepare the data so that a recom-
mendation can be provided to a user about a third-party
object that can be associated with an action-based outcome
such as a purchase upon use of the third-party object. Credit
card companies and financial institutions are constantly
coming out with new products and marketing schemes that
would entice consumers to obtain a new credit card or sign
up for a debit card. It can be incredibly difficult for con-
sumers to know what credit cards would most benefit them
based on their individual spending habits and needs. No two
consumers are exactly alike, and the credit cards that work
best for one person may be entirely different than what
would work best for another person. Credit cards can have
different promotions, different interest rates, different store-
specific incentives, purchase-category incentives, rewards,
benefits, etc. and a need exists to perform customized data
analysis of third-party data in order to produce a compre-
hensive and robust analysis of the many different third-party
products that are being offered.

The data that is collected from databases from credit card
institutions, financial institutions, etc. can be stored in many
different types of data formats, and it can be challenging to
aggregate, standardize, and eliminate data duplicates at a
rate that would keep up with the constantly changing pro-
motions and product offerings offered by third parties. The
systems and methods disclosed herein provide a practical
application to computer technology because all of this data
is converted into a standardized format, which provides an
improvement over prior art systems that may be used to
analyze products. The object data may be pulled from
third-party databases that use different types of code lan-
guage to store their data that can have numerous file types
(e.g., video, audio, data tables, etc.). The disclosed systems
and methods streamline this data standardization process so
that the data can provide a value to the enterprise.

Specifically, the systems and methods disclosed herein
describe a specific improvement for collecting object data
from third-party databases at night or at other predetermined
times that would produce less strain on system resources.
Further, the systems analyze the object data and convert that
data into a standardized format regardless of the format in
which the information was provided by a third party or
stored to a third-party database. Advantageously, this
enables the system to provide customized recommendations
to customers in a way that would help customers determine
what credit card or other third-party object would be most
applicable to their life circumstances and the purchases
typically made by that customer.

FIGS. 7A and 7B are a block diagrams of an example
method 700 for receiving and formatting third-party data
from third-party databases. At block 705, the system queries
one or more third-party databases to obtain object data for
each third-party object of a plurality of third-party objects.
Third party objects may include credit cards, debit cards,
virtual methods of payment, cryptocurrency, or other means
of peer-to-peer financial transactions and each third-party object has object data associated therewith. The object data may include information about the type of credit score that a consumer would need in order to qualify for the third-party object, the duration of any promotion that provides the benefits or rewards (e.g., a six-month introductory promotion), any applicable interest rates, store-specific or purchase-category-specific information (e.g., if you shop at a specific store, what would benefit would the consumer receive if they use the card at that store; if the consumer makes purchases that fall under a certain category such as food, entertainment, etc. what benefit would the consumer receive if they use the card; etc.), any fees that a consumer would need to pay to sign up for the third-party object, if a certain income level is needed to qualify for the third-party object, etc. The third-party objects may also be associated with action-based outcomes obtainable via use of the third-party objects, where the action-based outcomes can include benefits, rewards, points, cashback, etc. that a user can obtain each time the third-party object is used (i.e., an "action"). Further, the one or more third-party databases may be queried during a predetermined time (e.g., during predicted lower usage times, at night, etc.) where there is relatively less operation strain on system resources associated with the one or more third-party databases.

In some embodiments, the predetermined time at which the third-party database(s) are queried may be determined based on a prediction made by an artificial intelligence (AI) algorithm, such as those described herein that has been trained in accordance with the method 600 described by FIG. 6.

The system may maintain a record of rules established by the third-party system(s) associated with the third party database(s), such as limitations on the amount of queries per day, time limitations between queries, or the amount of data that can be transmitted in response to a query. In one embodiment, to eliminate unnecessary queries, the system may keep a query log, logging which third-party databases were queried at what time(s). Query intervals may be set at fixed time intervals, or they may be predicted by machine learning models that predict a time that would be best to perform the query and subsequent analysis in order to limit operational strain on the system. In one embodiment of the device, a trained machine learning model will dictate the length of query intervals for each third-party database. The third-party databases may have individual query intervals, or queries to all third-party databases may be on the same query schedule.

At block 710, the system receives the queried object data from the one or more third party databases. The queried object data may be stored permanently or it may be stored in a temporary manner.

At block 715, the system standardizes the formatting of the object data received from the one or more third party databases. The standardization of the formatted data may include transforming the data into a uniform datatype format. It may also include removing metadata from the data, cleaning the data, or other pre-processing necessary to standardize the data. In some instances, the object data that is received may be converted into a uniform format through normalization to ensure it is consistent in accordance with various standardization rules (e.g., using decimal place normalization, data type normalizations, formatting normalization, Z-score normalization, linear normalization, clipping normalization, standard deviation normalization, etc.). In some embodiments, the uniform datatype can include JavaScript Object Notation.

The system, in the process of removing the metadata from the object data received from the one or more third-party databases, may attach its own metadata to the object data. This new system metadata may include the time of the query that resulted in the data, the time between the transmission of the query and the receiving of the data, the amount of data received from the query, etc. The new system metadata may be used in the method 600 of FIG. 6 to train an artificial intelligence model. An artificial intelligence model trained using system metadata may be used to create predictions relating to optimal query times to query the third-party databases for third-party object data. The artificial intelligence model trained using system metadata may also be used to optimize queries to the third-party databases. As the artificial intelligence model processes the queries to the third-party databases and the amount of time between transmission of query and receipt of data, the system may learn patterns within the queries that are more or less optimal for minimal amount of time between query transmission and receipt of data while still maintaining the same amount of data received from the query.

At block 720, the system compresses the received object data, which includes encoding the object data to reduce storage size of the object data by determining whether stored action-based outcomes are duplicative with updated action-based outcomes that are identified from the received object data. This may include, for example, further pre-processing steps such as the removal of duplicate entries within the third-party data, or removing data associated with third-party objects already stored in the enterprise system. Compression techniques such as lossless or lossy techniques may be used to reduce the storage size of the object data.

At block 725, the system classifies the received object data using metadata labeling of the received object data. The labeling includes identifying and indicating third-party coding that is associated with the action-based outcomes (e.g., merchant category codes, card acceptor business codes, etc.). The classified object data may be classified according to one or more indexing rules to facilitate generation of a prioritization list, where the prioritization list indicates one or more derived improvements that would be available to the user during use of a third-party object of the plurality of third-party objects. In some embodiments, the one or more indexing rules to facilitate generation of a prioritization list are derived from user data associated with a user account. In some embodiments, generation of the prioritization list favors one or more third party objects of the plurality of third party objects associated with a singular third party of the one or more third parties. In an embodiment where the original metadata was removed, this may include creating new metadata to tag the received object data with. In other embodiments, this may include overwriting existing metadata or adding metadata to the received object data. Classification may be done manually or by an algorithm. Classification algorithms may include, but are not limited to, k-nearest neighbors (KNN), neural networks, decision trees, or random forest. In some embodiment, generation of the prioritization list includes applying the user data to a machine learning model, such as those described herein, that has been trained using the one or more rules to derive the improvements available to the user. The machine learning model may make predictions about which third-party object would be optimal for a specific user during a specific transaction. The prioritization list can list each of the third-party objects (e.g., credit cards, debit cards, etc.) and prioritize the cards in accordance with the one or more indexing rules (e.g., based on the total benefits obtained, based on available credit limit, based on interest rates, etc.).

According to one embodiment, the machine learning model that makes predictions about an optimal third-party object can be trained using training data of a plurality of users, where the machine learning model is trained to predict recommended actions (e.g., to predict which card should be used) custom to at least one of the plurality of users. The training includes inserting the training test data into a training and testing loop to predict a target variable and repeatedly, in each training of the training and testing loop, simulating predicted recommended actions that are derived from the training test data of the plurality of users. Further, in each training iteration, the predicted outputs are tested and compared to the target variable. In each training iteration, the system then indicates, via a feedback mechanism of the training and testing loop, node connections for which weights applied to the node connections need to be modified to improve predictability of the target variable and reduce error. Further, the system updates calculations used to predict the target variable by adjusting the weights, thereby reducing the error and improving predictability of the target variable. The trained machine learning model is then deployed to predict the recommended actions.

In some embodiments, the method 700 further includes identifying one or more objects (e.g., credit cards for which the user is not currently using or is not currently subscribed) available to the user that are predicted to increase user engagement with an entity that is associated with the profile of the user where the profile is used to display the prioritization list and the one or more objects would enhance the user's preferred action-based outcomes. For example, the system may determine that the user often uses their card at the grocery store, and there is a debit card or credit card for which the user would qualify (e.g., is pre-approved to receive based on their credit score and other factors) that provides more benefits (e.g., enhanced cashback) than the existing cards used by the user. The system may identify and recommend the credit card to the user in order to help the user enhance their preferred action-based outcomes (e.g., enhance cashback for purchases made at grocery stores). Thus, identification of the one or more objects may be based on user data of the user's historical behavior. In some embodiments, identifying the one or more objects includes using an AI model that is trained to predict a plurality of objects that would increase the user engagement with the entity.

FIG. 8 is a block diagram of an example method 800, according to an embodiment of the invention. At block 805, the system receives, from one or more third-party databases, object data associated with action-based outcomes obtainable via use of a respective third-party object of a plurality of third-party objects. At block 810, the system compresses the received object data, the compressing including encoding the object data to reduce storage size of the object data by determining whether stored action-based outcomes are duplicative with updated action-based outcomes identified by the received object data. At block 815, the system classifies the received object data by metadata labeling of the received object data, the labeling including indicating third-party coding associated with the action-based outcomes, wherein the classified object data is classified according to one or more indexing rules to facilitate generation of a prioritization list, the prioritization list indicating one or more derived improvements available to a user during use of a third-party object of the plurality of third-party objects. In one embodiment, generating of the prioritization list includes applying the user data to a machine learning model that has been trained using the one or more rules to derive the improvements available to the user.

Aspects of the present invention are described herein with reference to flowchart illustrations and/or block diagrams of computer-implemented methods and computing systems according to embodiments of the invention. It will be understood that each block of the flowchart illustrations and/or block diagrams, and combinations of blocks in the flowchart illustrations and/or block diagrams, can be implemented by computer readable program instructions that may be provided to a processor of a general purpose computer, special purpose computer, or other programmable data processing apparatus (the term "apparatus" includes systems and computer program products). The processor may execute the computer readable program instructions thereby creating a means for implementing the actions specified in the flowchart illustrations and/or block diagrams. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the actions specified in the flowchart illustrations and/or block diagrams. In particular, the computer readable program instructions may be used to produce a computer-implemented method by executing the instructions to implement the actions specified in the flowchart illustrations and/or block diagrams.

The computer program instructions may also be stored in a computer-readable memory that can direct a computer or other programmable data processing apparatus to function in a particular manner, such that the instructions stored in the computer readable memory produce an article of manufacture including instructions, which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions, which execute on the computer or other programmable apparatus, provide steps for implementing the functions/acts specified in the flowchart and/or block diagram block or blocks. Alternatively, computer program implemented steps or acts may be combined with operator or human implemented steps or acts in order to carry out an embodiment of the invention.

In the flowchart illustrations and/or block diagrams disclosed herein, each block in the flowchart/diagrams may represent a module, segment, or portion of instructions, which comprises one or more executable instructions for implementing the specified logical function(s). In some implementations, the functions noted in the blocks may occur out of the order noted in the Figures. For example, two blocks shown in succession may, in fact, be executed substantially concurrently, or the blocks may sometimes be executed in the reverse order, depending upon the functionality involved.

Computer program instructions are configured to carry out operations of the present invention and may be or may incorporate assembler instructions, instruction-set-architecture (ISA) instructions, machine instructions, machine dependent instructions, microcode, firmware instructions, state-setting data, source code, and/or object code written in any combination of one or more programming languages.

An application program may be deployed by providing computer infrastructure operable to perform one or more embodiments disclosed herein by integrating computer readable code into a computing system thereby performing the computer-implemented methods disclosed herein.

Although various computing environments are described above, these are only examples that can be used to incorporate and use one or more embodiments. Many variations are possible.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form contain, such as "contains" and "containing") are open-ended linking verbs. As a result, a method or device that "comprises", "has", "includes" or "contains" one or more steps or elements possesses those one or more steps or elements, but is not limited to possessing only those one or more steps or elements. Likewise, a step of a method or an element of a device that "comprises", "has", "includes" or "contains" one or more features possesses those one or more features, but is not limited to possessing only those one or more features. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of one or more aspects of the invention and the practical application, and to enable others of ordinary skill in the art to understand one or more aspects of the invention for various embodiments with various modifications as are suited to the particular use contemplated.

What is claimed is:

1. A computing system for data aggregation and compression facilitating data base querying and file management, the system comprising:
   at least one processor;
   a communication interface communicatively coupled to the at least one processor; and
   a memory device storing executable code that, when executed, causes the at least one processor to:
      query one or more third-party data bases to obtain object data for each third-party object of a plurality of third-party objects, the object data being associated with action-based outcomes obtainable via use of each of the third-party objects, wherein the one or more third-party data bases are queried during a predetermined time having relatively less operational strain on system resources associated with the one or more third-party data bases;
      receive, from the one or more third-party data bases, the queried object data;
      standardize formatting of the received object data, the formatting being standardized such that the object data is transformed into a uniform datatype format for analysis;
      compress the received object data, the compressing including encoding the object data to reduce storage size of the object data by determining whether stored action-based outcomes are duplicative with updated action-based outcomes identified by the received object data; and
      classify the received object data by metadata labeling of the received object data, the labeling including indicating third-party coding associated with the action-based outcomes, wherein the classified object data is classified according to one or more indexing rules to facilitate generation of a prioritization list, the prioritization list indicating one or more derived improvements available to a user during use of a third-party object of the plurality of third-party objects.

2. The system for data aggregation and compression facilitating data base querying and file management according to claim 1, wherein the predetermined time having relatively less operational strain on system resources associated with the one or more third-party data bases is predicted by an Artificial Intelligence (AI) algorithm.

3. The system for data aggregation and compression facilitating data base querying and file management according to claim 1, wherein the uniform datatype for analysis is JavaScript Object Notation.

4. The system for data aggregation and compression facilitating data base querying and file management according to claim 1, wherein further compression of the received object data is performed using lossless compression techniques.

5. The system for data aggregation and compression facilitating data base querying and file management according to claim 1, wherein the generating of the prioritization list includes applying user data to a machine learning model that has been trained using the one or more rules to derive the improvements available to the user.

6. The system for data aggregation and compression facilitating data base querying and file management according to claim 5, wherein the executable code, when executed, further causes the at least one processor to:
   train, using training test data of a plurality of users, the machine learning model to predict recommended actions custom to at least one of the plurality of users, the training including:
      inserting the training test data into a training and testing loop to predict a target variable;
      repeatedly, in each training iteration of the training and testing loop, simulating predicted recommended actions that are derived from the training test data of the plurality of users;
      testing and comparing, in each training iteration, the predicted outputs to the target variable;
      indicating, via a feedback mechanism of the training and testing loop and in each training iteration, node connections for which weights applied to the node connections need to be modified to improve predictability of the target variable and reduce error; and updating calculations used to predict the target variable by adjusting the weights, thereby reducing the error and improving predictability of the target variable; and deploying the trained machine learning model to predict the recommended actions.

7. The system for data aggregation and compression facilitating data base querying and file management according to claim 1, wherein the executable code, when executed, further causes the at least one processor to identify one or more objects available to the user that are predicted to increase user engagement with an entity that is associated with a profile of the user where the profile is used to display the prioritization list, the one or more objects enhancing the user's preferred action-based outcomes, wherein the identifying of the one or more objects is based on the user's historical behavior.

8. The system for data aggregation and compression facilitating data base querying and file management according to claim 7, wherein the identifying of the one or more objects includes an Artificial Intelligence (AI) model that is trained to predict a plurality of objects that would increase the user engagement with the entity.

9. The system for data aggregation and compression facilitating data base querying and file management according to claim 1, wherein the one or more indexing rules to facilitate generation of a prioritization list are derived from user data associated with a user account.

10. The system for data aggregation and compression facilitating data base querying and file management according to claim 1, wherein the generation of the prioritization list favors one or more third party objects of the plurality of third party objects associated with a singular third party of the one or more third parties.

11. A computing method for data aggregation and compression facilitating data base querying and file management, the method comprising:

querying one or more third-party data bases to obtain object data for each third-party object of a plurality of third-party objects, the object data being associated with action-based outcomes obtainable via use of each of the third-party objects, wherein the one or more third-party data bases are queried during a predetermined time having relatively less operational strain on system resources associated with the one or more third-party data bases;

receiving, from the one or more third-party data bases, the queried object data;

standardizing formatting of the received object data, the formatting being standardized such that the object data is transformed into a uniform datatype format for analysis;

compressing of the received object data, the compressing including encoding the object data to reduce storage size of the object data by determining whether stored action-based outcomes are duplicative with updated action-based outcomes identified by the received object data;

classifying the received object data by metadata labeling of the received object data, the labeling including indicating third-party coding associated with the action-based outcomes, wherein the classified object data is classified according to one or more indexing rules to facilitate generation of a prioritization list, the prioritization list indicating one or more derived improvements available to a user during use of a third-party object of the plurality of third-party objects.

12. The method for data aggregation and compression facilitating data base querying and file management according to claim 11, wherein the predetermined time having relatively less operational strain on system resources associated with the one or more third-party data bases is predicted by an Artificial Intelligence (AI) algorithm.

13. The method for data aggregation and compression facilitating data base querying and file management according to claim 11, wherein the uniform datatype for analysis is JavaScript Object Notation.

14. The method for data aggregation and compression facilitating data base querying and file management according to claim 11, wherein further compression of the received object data is performed using lossless compression techniques.

15. The method for data aggregation and compression facilitating data base optimization according to claim 11, wherein the generating of the prioritization list includes applying user data to a machine learning model that has been trained using the one or more rules to derive the improvements available to the user.

16. The method for data aggregation and compression facilitating data base querying and file management according to claim 15, further comprising:

training, using training test data of a plurality of users, the machine learning model to predict recommended actions custom to at least one of the plurality of users, the training including:

inserting the training test data into a training and testing loop to predict a target variable;

repeatedly, in each training iteration of the training and testing loop, simulating predicted recommended actions that are derived from the training test data of the plurality of users;

testing and comparing, in each training iteration, the predicted outputs to the target variable;

indicating, via a feedback mechanism of the training and testing loop and in each training iterations, node connections for which weights applied to the node connections need to be modified to improve predictability of the target variable and reduce error; and updating calculations used to predict the target variable by adjusting the weights, thereby reducing the error and improving predictability of the target variable; and deploying the trained machine learning model to predict the recommended actions.

17. The method for data aggregation and compression facilitating data base querying and file management according to claim 11, wherein the one or more indexing rules to facilitate generation of a prioritization list are derived from user data associated with a user account.

18. The method for data aggregation and compression facilitating data base querying and file management according to claim 11, wherein the generation of the prioritization list favors one or more third party objects of the plurality of third party objects associated with a singular third party of the one or more third parties.

19. A computing system, comprising:

at least one processor;

a communication interface communicatively coupled to the at least one processor; and a memory device storing executable code that, when executed, causes the at least one processor to:

receive, from one or more third-party databases, object data associated with action-based outcomes obtainable via use of a respective third-party object of a plurality of third-party objects;

compress the received object data, the compressing including encoding the object data to reduce storage size of the object data by determining whether stored action-based outcomes are duplicative with updated action-based outcomes identified by the received object data; and classify the received object data by metadata labeling of the received object data, the labeling including indicating third-party coding associated with the action-based outcomes, wherein the classified object data is classified according to one or more indexing rules to facilitate generation of a prioritization list, the prioritization list indicating one or more derived improvements available to a user during use of a third-party object of the plurality of third-party objects.

20. The computing system of claim 19, wherein the generating of the prioritization list includes applying user data to a machine learning model that has been trained using the one or more rules to derive the improvements available to the user.

\* \* \* \* \*